United States Patent [19]
Tobagi et al.

[11] Patent Number: 5,732,239
[45] Date of Patent: Mar. 24, 1998

[54] METHOD FOR OPERATING A DISK STORAGE SYSTEM WHICH STORES VIDEO DATA SO AS TO MAINTAIN THE CONTINUITY OF A PLURALITY OF VIDEO STREAMS

[75] Inventors: Fouad A. Tobagi, Los Altos; Randall B. Baird, San Jose; Joseph Mark Gang, Jr., Saratoga; Joseph W. M. Pang, Fremont, all of Calif.

[73] Assignee: Starlight Networks, Mountain View, Calif.

[21] Appl. No.: 246,220

[22] Filed: May 19, 1994

[51] Int. Cl.[6] .............................. G06F 13/20; G06F 12/08
[52] U.S. Cl. .................................... 395/441; 395/826
[58] Field of Search ........................... 395/441, 440, 395/439, 826

[56] References Cited

U.S. PATENT DOCUMENTS

| | | | |
|---|---|---|---|
| 4,536,836 | 8/1985 | Dodd et al. | 395/440 |
| 4,636,946 | 1/1987 | Hartung et al. | 395/463 |
| 4,688,168 | 8/1987 | Gudaitis et al. | 395/287 |
| 5,008,819 | 4/1991 | Gorbatenko | 395/443 |
| 5,140,683 | 8/1992 | Gallo et al. | 395/444 |
| 5,197,143 | 3/1993 | Lary et al. | 395/309 |
| 5,218,695 | 6/1993 | Noveck et al. | 395/621 |
| 5,220,653 | 6/1993 | Miro | 395/677 |
| 5,261,072 | 11/1993 | Siegel | 395/842 |
| 5,263,145 | 11/1993 | Brady et al. | 395/441 |
| 5,301,297 | 4/1994 | Menon et al. | 395/441 |
| 5,331,417 | 7/1994 | Soohoo | 348/584 |
| 5,440,683 | 8/1995 | Nally et al. | 395/513 |
| 5,448,315 | 9/1995 | Soohoo | 348/722 |

FOREIGN PATENT DOCUMENTS

| | | |
|---|---|---|
| 0 458 554 A2 | 11/1991 | European Pat. Off. . |
| 0 521 630 A3 | 1/1993 | European Pat. Off. . |
| WO-A-90/00280 | 1/1990 | WIPO . |
| WO-A-91/13404 | 9/1991 | WIPO . |
| WO-A-92/04674 | 3/1992 | WIPO . |
| WO-A-94/12937 | 6/1994 | WIPO . |

OTHER PUBLICATIONS

Reddy et al., "I/O Issued in a Multimedia System", Mar. 1994, pp. 69–74, Computer Magazine.
Vin et al., "Designing Multiuser HDTV Storage Server", Jan. 1993, pp. 153–164, IEEE.
Tetzlaff et al., "A Methodology for Evaluating Storage Systems in Distributed and Hierarchical Video Servers", 94, pp. 430–439, IEEE.
T. Chiueh, et al., "Multi–Resolution Video Representation for Parallel Disk Array's", Proceedings ACM Multimedia '93, Aug. 1993, pp. 401–409.
F.A. Tobagi, et al., "Streaming RAID–A Disk Array Management System for Video Files", Proceedings ACM Multimedia '93, Aug. 93, pp. 393–400.
S. Ghanderharizadeh, et al., "An Overview of Techniques to Support Continuous Retrieval of Multimedia Objects", Computer Architecture News, vol. 21, Dec. 93, pp. 39–46.
E. Chang, et al. "Scalable Video Data Placement on Parallel Disk Arrays", Proceeding SPIE, Storage and Retrieval for Image Video Database II, vol. 2185, Feb. 94, pp. 208–221.

(List continued on next page.)

*Primary Examiner*—Eddie P. Chan
*Assistant Examiner*—Kevin L. Ellis
*Attorney, Agent, or Firm*—Meltzer, Lippe, Goldstein, et al.

[57] ABSTRACT

A method for increasing the storage capacity of a video server which utilizes an array of disks is disclosed. The server is operated so that the continuity of a plurality of bit streams is maintained. The inventive method has advantageous characteristics with respect to storage capacity, streaming capacity, start-up latency of new streams, amount of required buffer capacity, scalability, reliability and multiple bit rates.

31 Claims, 18 Drawing Sheets

OTHER PUBLICATIONS

P. Rangan, et al., "Designing an On-Demand Multimedia Service", IEEE Communications Magazine, Jul. 1992, pp. 56–64.

P. Yu et al., "Design and Analysis of a Grouped Sweeping Scheme for Multimedia Storage Management", Lecture Notes in Computer Science, Network and Operating System Support for Digital Audio and Video, Third International Workshop, La Jolla, California, Nov. 1992, Proceedings, pp. 44–55.

D. Anderson, et al., "A File System for Continuous Media", ACM Transactions on Computer Systems, vol. 10, No. 4, Nov. 1992, pp. 311–337.

H.M. Vin, et al., "Admission Control Algorithms for Multimedia On-Demand Servers", Multimedia Library, Dept. of Computer Science and Engineering, University of California at San Diego, pp. 56–68.

J. Gemmel, et al., "Principles of Delays Sensitive Multimedia Data Storage and Retrieval", ACM Transactions and Information Systems, vol. 10, No. 1, Jan. 1997, pp. 51–90.

P. Rangan et al., "Designing File Systems for Digital Video and Audio", Operating System Review, Col. 25, No. 5, Oct. 13–16, 1991, pp. 81–94.

H. Katseff, "On the Synchronization and Display of Multiple Full-Motion Video Streams", IEEE, 1991.

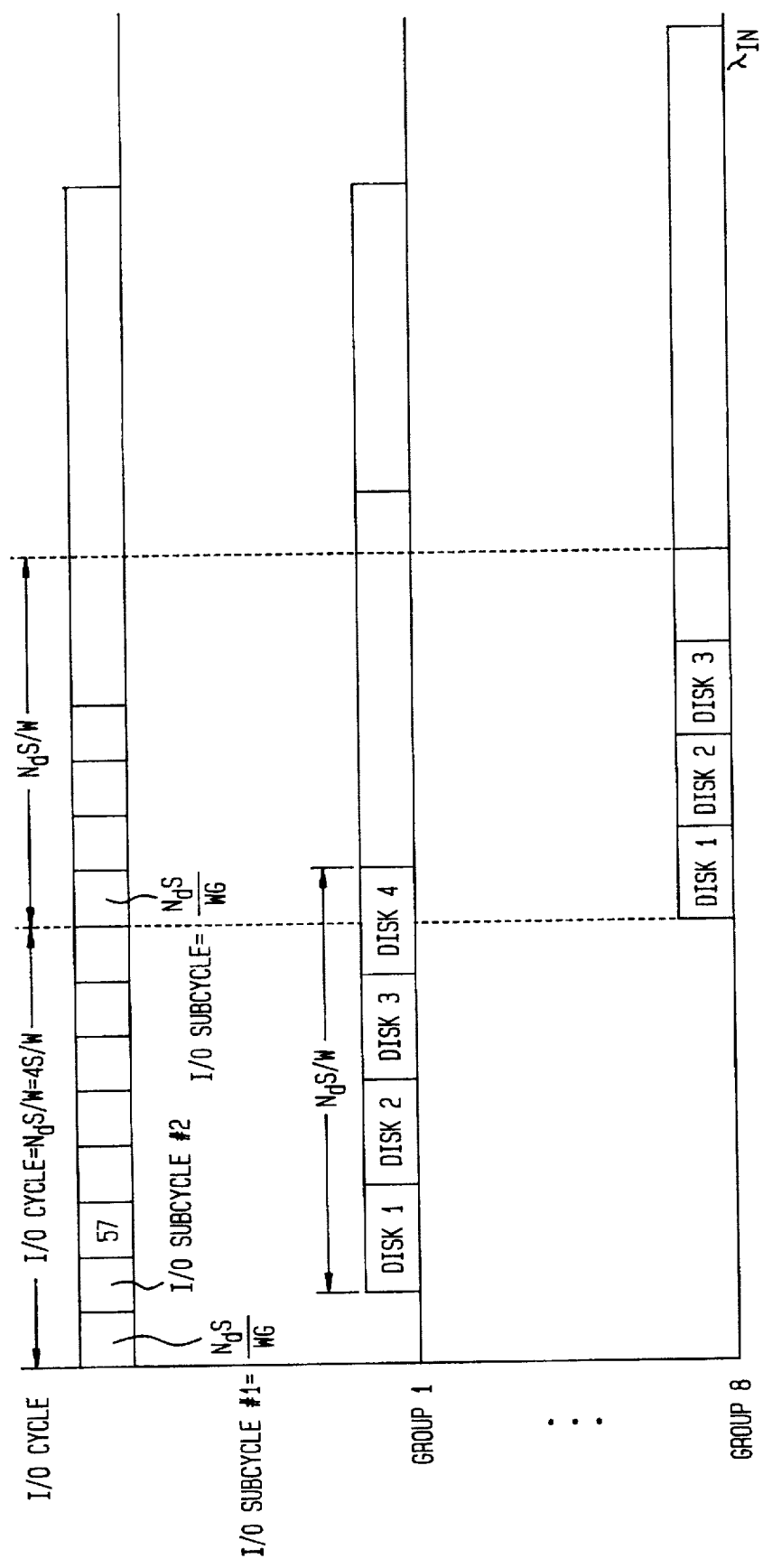

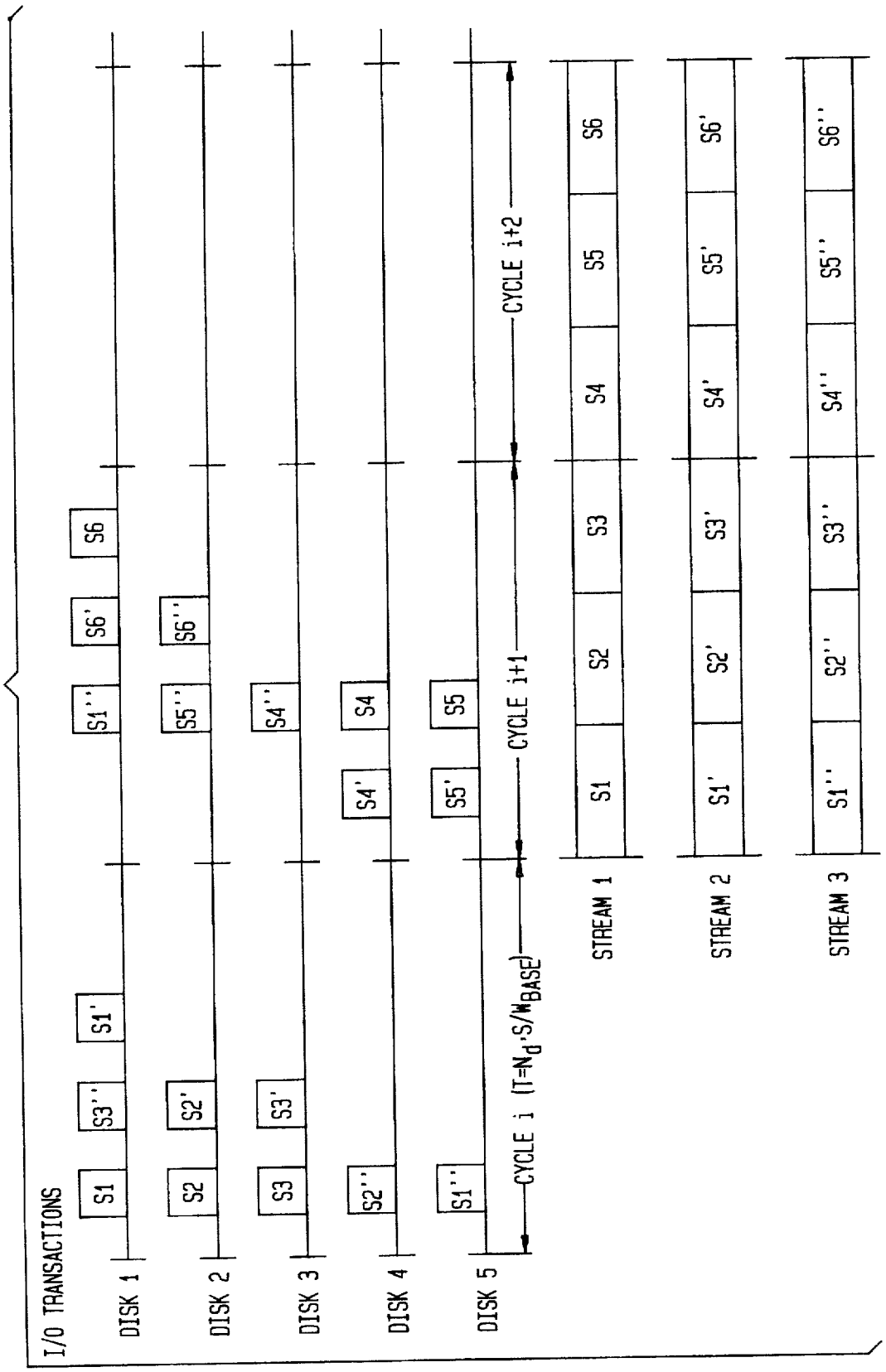

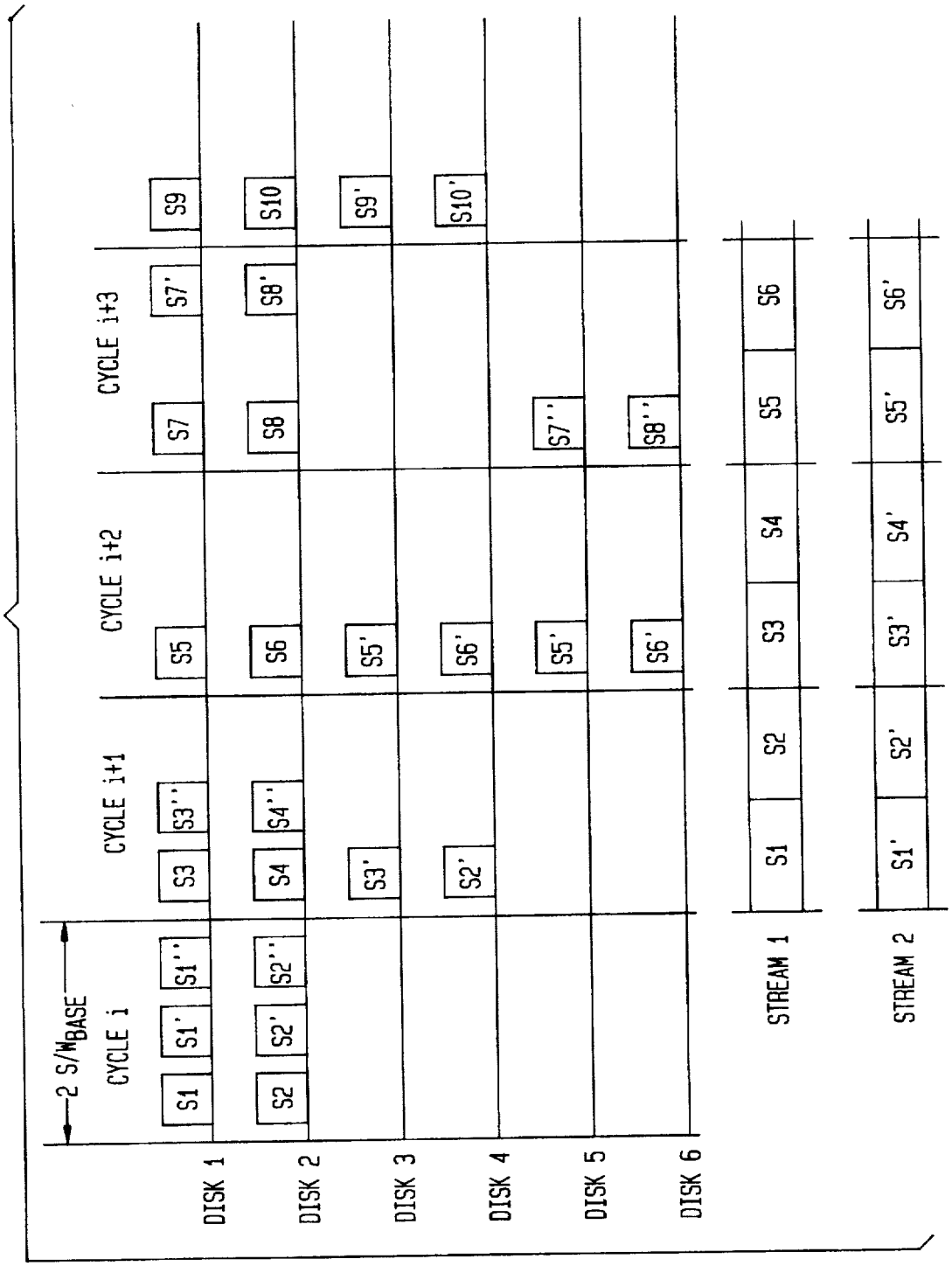

5,732,239

METHOD FOR OPERATING A DISK STORAGE SYSTEM WHICH STORES VIDEO DATA SO AS TO MAINTAIN THE CONTINUITY OF A PLURALITY OF VIDEO STREAMS

RELATED APPLICATION

A patent application entitled METHOD OF OPERATING A DISK STORAGE SYSTEM has been filed for Fouad A. Tobagi, Joseph M. Gang, Jr., Randall B. Baird, Joseph W. M. Pang, and Martin J. McFadden on Nov 17, 1992, bears Ser. No. 07/977,493, now U.S. Pat. No. 5,581,784, and is assigned to the assignee hereof. Another patent application entitled VIDEO APPLICATION SERVER has been filed for James E. Long, Joseph M. Gang, Jr., Charles J. Bedard, Randall B. Baird, and David A. Edwards on Jun. 24, 1993, bears Ser. No. 08/082,227, now U.S. Pat. No. 5,556,982, and is assigned to the assignee hereof. The above-identified applications contain subject matter related to the subject matter of the present application and are incorporated herein by reference.

FIELD OF THE INVENTION

The present invention relates to a method for operating a disk storage system which stores video data so as to maintain the continuity of a plurality of video streams. In particular, the present invention provides a method for operating a disk storage system which is flexible with respect to storage capacity, streaming capacity, the start up latency of new streams, and the amount of buffer capacity required. The inventive method also has advantageous properties with respect to scalability (the addition of more disks), reliability, and multiple bit rates.

BACKGROUND OF THE INVENTION

The demand for networked digital audiovisual systems is expected to grow considerably over the next few years as businesses, government and other institutions increasingly turn to digital networks to distribute audiovisual information for education, presentations and reference applications. These customers expect systems that will allow a number of people to be able to view audiovisual information from a server simultaneously, while fully retaining their other network functions.

The characteristics of files, file access and network traffic in digital video applications differ substantially from those encountered in data applications. With data applications, whenever a user makes a file access request to a server, or requests that data be transmitted on a network, the user expects a fast response—fast compared to the time it takes it to place the next request. As a result, the capacity of a server and the overall bandwidth must both be large compared to the average demand placed by a single user. Accordingly, the design of a file server aimed at supporting data applications and the design of a network to support data traffic have been based on the principle of bandwidth sharing and statistical time multiplexing. File servers have furthermore taken advantage of the property of locality in file access, and incorporated appropriate caching mechanisms. In all cases, as the overall load on the shared resources increased, the average response time experienced by all users also increased.

Consider now digital video. A video signal is analog in nature and continuous over time. It is digitized by first sampling it at regular intervals, and then by quantizing each sample. This digitization process results in a data stream which is of relatively constant and very high rate (NTSC signals result in data rates in the neighborhood of 100 Mb/s and an HDTV signal, 600 Mb/s.) However, given that the sampled data exhibits a great deal of redundancy, compression is applied, thus significantly reducing the stream's rate. Depending on the bandwidth of the original analog signal, the sampling rate, the quantization step size, the encoding method, and the desired image quality, the resulting data rate for a digital video signal ranges from 64 Kb/s to tens of Mb/s. For example, CCITT Recommendation H.261 specifies video coding and decoding methods for audio visual services at the rate of px64 Kb/s, where p is in the range of 1 to 30 (i.e., 64 Kb/s to 2 Mb/s). The MPEG standard specifies a coded representation that can be used for compressing video sequences to bit rates around 1.5 Mb/s. Advances in compression techniques and their VLSI implementations are among the important reasons why video services over LANs and WANs are becoming practical.

Two important observations can be made. The first is that the volume of bits corresponding to a digitized video segment of useful duration (even compressed) is large. A ten minute MPEG video segment requires over 100 Mbytes of storage; ten hours requires over 5 Gbytes. Thus video servers where such video information is to be stored must have relatively large storage capacity.

The second observation is that the communication of digital video data between two nodes on a local area network (e.g., a server and a desktop station) requires that data be transmitted in a stream fashion. This means that video data packets must be delivered to the destination on time, and failure to deliver video data packets on time would result in video quality degradation. This has two main implications: (i) from a network's point of view, one requires the availability, on a continuous basis, of a bandwidth at least equal to the signal's data rate; (ii) from a file and storage system point of view, one requires streaming capabilities which guarantee the continuity of each stream being retrieved or stored. Thus, in order to support multiple independent video signals, the network must have the necessary aggregate bandwidth as well as means to guarantee the bandwidth required for each video stream, and the file storage system must be of the streaming type and must have a capacity sufficient to handle all video streams. By the same token, there is a maximum number of video steams of a given data rate that a network and a server can support, and means are provided to prevent additional requests from overloading the system.

It is thus clear that the characteristics of video traffic differ substantially from those of traditional data traffic to the point that servers and local area networks designed primarily to support data applications are not appropriate to effectively support video services. New capabilities in servers and networks must be offered.

The focus in this application is on the design and operation of a storage system suitable for a video server, noting again that the storage requirements for video data are different from the storage requirements for typical LAN data in two respects:

(i) the size of video files is an order of magnitude greater or more; even with compression techniques, the physical storage needs are large.

(ii) when serving a video stream, be it for recording or playback, it is desirable to maintain the continuity of the stream. In the case of playback, data must be retrieved from the storage medium, transmitted over the network, and made available to the decoder no later than the time at which it is needed so as to avoid letting the decoder run dry. Similarly, when a stream is getting recorded, the writing of data on the storage medium must keep up with the rate at which it is getting produced so as to avoid buffer overflow and data loss.

A server's storage system preferably satisfies the following requirements:

(i) provide random access capability for both recording and playback;

(ii) have the storage capacity required by the application;

(iii) have the I/O throughput required to support simultaneously a target maximum number of users (streams); and (iv) guarantee a start-up latency for new streams within a specified maximum tolerable threshold.

Due to their random access read and write capability, wide availability, and low cost, magnetic disk drives emerge as very appropriate storage components for this purpose. Multiple drives can be used in order to provide the necessary storage capacity and/or to achieve an aggregate throughput larger than that achieved with a single drive.

A magnetic disk storage system 20 is illustrated in FIG. 1. The disk storage system 20 comprises a plurality of disk drives 200. Each disk drive 200 comprises a disk 21 and a controller 210. The disk drive 200 is shown in greater detail in FIG. 2. As shown in FIG. 2, the disk 21 of the disk dive 200 comprises a plurality of platters 22. Each platter 22 has one or two magnetic surfaces, a bottom surface 23 and/or a top surface 24, for recording. Associated with each recording surface 23 or 24 is a read/write head 26. In the disk 21 of FIG. 2, let h denote the number of heads, and thus, usable surfaces. The heads 26 are moved to particular locations on the platter surfaces 23,24 by the actuator 28 which is controlled by a controller 210. Thus, the controller 210 controls the proper positions of the read/write heads 26 and the transfer of data in both directions between the magnetic surfaces and a local buffer 30 which forms part of the controller 210. The controller 210 also manages the transfer of data across the SCSI bus 220 (see FIG. 1) into and out of a buffer internal to the adapter 230. The adapter 230 is then in charge of the transfer of data, via the system bus 250, into and out of the server computer system 26 which includes the memory 260, CPU 270, and network interface 280. In the case of a stand-alone system, the computer system 26 may not be a server and may not include a network interface.

As shown in FIG. 3, each recording surface 23, 24 is divided into a number of concentric tracks. Tracks on all surfaces which are located at the same radius form a cylinder. The number of tracks in a cylinder is thus equal to h. Let c denote the number of tracks per surface (and thus also the number of cylinders), and consider the tracks (and thus cylinders) to be numbered sequentially 1, . . . , c, starting with the outer track (cylinder). Each track is divided into a number of fixed size sectors. Due to the circular geometry of the surface, the number of sectors in a track is not the same for all tracks; there being more sectors in outer tracks than in inner tracks.

As shown in FIG. 4, the cylinders in the disk are divided into subsets of contiguous cylinders called zones, such that the number of sectors per track in a zone is the same for all tracks in the zone. We let Z denote the number of zones, and consider the zones to be numbered sequentially from 0 to Z-1 starting with the outer zone on the disk. In FIG. 4, the number of sectors in a track of zone i is designated $\sigma_i$, and the number of cylinders in zone i is designated $k_i$. Note that not all disks are organized into zones.

The disk rotates permanently at a constant speed of R rotations per minute, and the read/write heads are moved all together from one cylinder to another, as needed. All I/O transactions are for an integral number of sectors, the specific number of which depends on the application. To limit the overhead caused by head movement when writing or reading a block of data, the sectors on the disk are used consecutively and sequentially, going from sector to sector on a given track, from track to track in a given cylinder, and from cylinder to cylinder.

An example of a disk drive is the HP C2240 drive which has h=13 read/write heads, a total of c=2051 cylinders, and rotational speed of R=5400 rotations/minute. The 2,051 cylinders comprise 1981 data cylinders, 69 spares, and one for logs and maintenance information. They are organized into eight zones.

When a request for an I/O operation is placed on the disk storage system (say a read or write operation for some number of consecutive sectors), the heads are first moved under the control of the controller 210 to the cylinder where the first sector is located; the delay incurred in this operation is referred to as the seek time ($X_{seek}$). The head corresponding to the appropriate track then waits until the first sector appears under it, incurring a delay referred to as the rotational latency ($X_{ro}$). Once the first sector is located, the head begins reading or writing the sectors consecutively at a rate determined by the rotational speed; the time to read or write all sectors constituting the block is referred to as the transfer time ($X_{transfer}$). Note that if the block of data spans sectors located on more than one track is a given cylinder, then a switch from one head to the next is made at the appropriate time, thus incurring a so-called head switch time. If the block spans sectors located on multiple cylinders, then a head movement from one cylinder to the next takes place, thus incurring a track-to-track seek time each time this occurs. Accordingly, in performing an I/O operation, a certain amount of time is required. To assess the performance of a disk supporting an application, an analysis of the time required in each transaction must be undertaken.

The total time required in performing a read or write operation for a block $T_{I/O}$(block), is the sum of seek time, rotational latency, and transfer time.

$$T_{I/O}(block) = X_{seek} + X_{ro} + X_{trans}$$

FIG. 5 shows how the total time $T_{I/O}$ for a block is divided into, seek time, rotation latency, and transfer time. As shown in FIG. 5, the transfer time includes some head switch times and/or track-to-track seek times. It should be noted that seek times, rotational delays and transfer times may be random and not known a priori.

Note that to get the total time required to get the data transferred into the system's memory, one should also account for any additional time that may be incurred in contending for the SCSI bus and in transferring the data from the controller's buffer to the system's memory. However, as these operations take place to a large degree simultaneously with the transfer of data off the disk into the controller's memory, such additional delay is negligible and may be ignored.

In the patent application entitled METHOD OF OPERATING A DISK STORAGE SYSTEM filed for Fouad A. Tobagi, Joseph M. Gang, Jr., Randall B. Baird, Joseph W. M. Pang, and Martin J. McFadden on Nov 17, 1992, bearing Ser. No. 07/977,493, now U.S. Pat. No. 5,581,784, a method for operating a disk storage system comprising one or more disks is described. The disk storage system is operated so as to simultaneously maintain the continuity of a plurality of data streams. The disk storage system may be located in a network such as a local area network and maintain the continuity of a plurality of streams in the network. The network server which includes the video storage system, and a plurality of user stations are connected via a shared transmission medium. In this case, a plurality of video streams may be transmitted simultaneously between various users and the server via the shared transmission medium. Alternatively, the disk storage system may be part of a stand-alone system in which a plurality of video streams are retrieved from storage and displayed locally on a monitor, or received from an external source and locally stored in the disk storage system. (Thus, the inventive method is described below in connection with a network such as a LAN, but it should be understood that the method of operating a disk storage system is not restricted to use in such a network. In addition, it should be noted that the inventive method is described below in connection with an array of disks. However, the invention is equally applicable to arrays of other storage units. For example, each storage unit may itself be a server and an associated array of disks). Disks may be optical disks, magnetic disks, other storage media or instead of disks, random storage media may be used such as semiconductor memories. The storage units may also be tape drives.

In accordance with the method described in U.S. patent application Ser. No. 07/977,493, now U.S. Pat. No. 5,581,784, I/O transactions take place in I/O cycles. For streams produced by (i.e., read out of) the disk storage system, the data is consumed by the network in consumption cycles which follow one another without gaps. For streams produced by the network to be written into the disk storage system, the data is produced in production cycles which follow one another without gaps.

Illustratively, the disk storage system comprises one disk. Each data stream is either produced by the network (e.g., produced by a video coder in the network) at a constant base rate of $W_{base}$ bits per second and consumed by the disk, or produced by the disk and consumed by the network (e.g., consumed by a video decoder in the network) at a constant base rate of $W_{base}$ bits/sec. One I/O transaction is performed for each stream in each of a plurality of successive I/O cycles of duration $S/W_{base}=T_{play}$. In each I/O transaction, a segment of S bits is stored in or retrieved from the disk. Illustratively, $W_{base}=1.2$ Mbits/sec and $S=40$ Kbytes. It should be noted that $T_{I/O}$, the total time for each I/O transaction $(T_{I/O}=X_{seek}+X_{ro}+X_{trans})$, is much shorter than $T_{play}$ which is the time it takes the network to produce or consume a segment of S bits of a stream.

The number of streams whose continuity can be simultaneously maintained is limited by the number of I/O transactions which can be performed in an I/O cycle of duration $T_{play}$. This depends on the locations of the retrieved and stored segments in the disk (as $T_{I/O}$ for each transaction depends on the location) as well as the order in which the I/O transactions are scheduled.

Two modes of operation can be considered. The first mode of operation, known as the synchronous mode is such that the I/O transactions for the active streams are scheduled in a particular predetermined order in each I/O cycle, but the production or consumption cycles of duration $T_{play}$ in which the data segments of the active streams are produced or consumed by the network are not necessarily aligned with each other.

The second mode of operation is known as the gated operation and is the preferred mode. The order of I/O transactions for the active streams may vary from one I/O cycle to the next. The advantage of allowing the order of the I/O transactions to vary from cycle to cycle is that the I/O transactions to be performed in a cycle may be sorted according to their locations on the disk so as to minimize the total I/O overhead. In order to be able to let the order of I/O's to vary from cycle to cycle, it is important not to allow the consumption of segments fetched in a given I/O cycle to take place earlier than the end of the given I/O cycle or to allow the production of segments to be stored in a given I/O cycle to take place later than the beginning of the given I/O cycle. If consumed (produced) at the earliest (latest) time, then the consumption (production) cycle for a segment fetched (stored) in a given I/O cycle for a given stream would coincide with the following (preceding) I/O cycle. If this is the case for all streams, then the consumption and production cycles for all streams are aligned with each other, as well as with the I/O cycles.

One way of implementing the gated operation described above is as follows: a sequence of I/O cycles of duration $T_{play}$ is defined, i.e., $T^1_{play}, T^2_{play}, \ldots$. In each cycle $T^i_{play}$, each stream has one I/O transaction In addition, in each cycle $T^i_{play}$, for each stream, one data segment S is consumed or produced by the network. Segments which are consumed by the disk in cycle $T^i_{play}$ are produced by the network in I/O cycle $T^{i-1}_{play}$. Segments which are produced by the disk in cycle $T^i_{play}$ are consumed by the network in cycle $T^{i+1}_{play}$. FIG. 6 illustrates the I/O cycles of three streams (stream 1, stream 2, and stream 3) and the corresponding consumption and production cycles.

Recall that the advantage of allowing the order of the I/O transactions to vary from cycle to cycle is that the I/O transactions to be performed in a cycle may be sorted according to their locations on the disk so as to minimize the total I/O overhead. Such sorting enables the number of I/O transactions performed in an I/O cycle of a given length to be optimized for a given segment size S.

To achieve a performance which is not dependent on the particular selection of files being played back or recorded (as pertaining to the location of the files on the disk), the locations of the segments belonging to each file can be randomized over the entire disk. The advantage of this is that the total I/O time $(T_{I/O})$ for any segments fetched in a cycle of duration $T_{play}$ is a random variable which is independent of the I/O time of all other segments to be fetched in the same, as well as in other, I/O cycles of duration $T_{play}$. As a result, the sum of the I/O times for all segments is the sum of independently and identically distributed random variables.

In order to increase the number of streams beyond that which is possible with a single disk, an array of multiple disks may be utilized. The number of disks in the array may be designated by $N_d$.

The array of $N_d$ disks (or other storage units) is operated according to the following criteria (in accordance with U.S. patent application 07/977,493, now U.S. Pat. No. 5,581,784 which is incorporated herein by reference).

1. Video data is stored and retrieved from each disk in the array in the form of fixed size segments. The fixed segment size of S bits simplifies the tasks of storing and retrieving data from the disks, and the tasks of managing the system memory where video data is buffered (e.g., in memory 260 of FIG. 1) before it is stored on the disks or after it is retrieved from the disks.

2. Segments belonging to a video stream are striped across the disk array (e.g., consecutive segments are allocated to the disks forming the array in a cyclic fashion). Thus, when a video stream is being recorded or played back, all disks in the array are accessed equally and thus incur the same load. (Note that this assumes that all disks have the same storage capacity; otherwise, the disk with the smallest storage capacity dictates the overall storage of the array). FIG. 7 is an example of a horizontal stripe.

3. Segments within a disk (and thus horizontal stripes within the array) are randomly layed out on the disk (the array). Thus, when the disks are of the zoned type, the disk transfer time for a segment belonging to a stream being recorded or played-back is independent of the particular stream in question or the particular segment within that stream. Thus, the performance of a disk (and thus the array) in terms of the number of streams that it can serve is independent of the particular streams being served. It is not necessary that all the segments which form a stripe across the array have the same physical address in the corresponding disks. Rather, segments in each disk can be placed in segment bins independently of the other disks.

4. I/O transactions for each disk are scheduled in cycles, whereby the cycle time is equal to the time it takes a stream to consume or generate as many segments as there are disks in the array, assuming, for example, that all streams are of equal constant data rates. For each stream being served, one I/O transaction is scheduled for each disk in each cycle. Assuming all streams have a production or consumption bit rate $W_{base}$, then the cycle time is $N_d S/W_{base}$, where $N_d$ is the number of disks in the array and S is the segment size. This corresponds to the fact that the rate at which data is generated must be equal to the rate at which data is consumed. The maximum number of streams $N_{max}$ that can be served (maintaining continuity at all times) is equal to the number of I/O transactions that can be performed in a disk in a cycle. This in turn depends on the segment size S and how the data is laid out on the disks (e.g. random or not). (Note that if the I/O throughput for all disks is not the same, then the disk with the smallest I/O throughput dictates the serving capacity of all other disks and thus of the disk array. Note also that if the data rate for a given stream is different from the nominal rate, then the number of I/O transactions performed in a cycle for that stream may be different from one; if the data rate for a stream is variable over time, then the number of I/O transactions for that stream may vary from cycle to cycle. In all cases, to maintain continuity for all streams being served, the number of I/O transactions required in each cycle should be smaller than the total number of I/O transactions that can be performed in a cycle).

5. By restricting the consumption of segments fetched in a cycle for a play-back stream to begin no earlier than the start of the following cycle, and equivalently, by guaranteeing that the production of data constituting a segment for a stream to be stored is complete prior to the beginning of the cycle during which the corresponding I/O transaction is to take place, it is possible to allow the order of I/O transactions corresponding to the various streams being served to vary from cycle to cycle. The advantage of this is to be able to sort the I/O transactions in each cycle according to the location of the corresponding segments on the disk(s), and thus to decrease the overall seek overhead time incurred and thus optimize the number of I/O cycles that can be performed in an I/O cycle.

Consider an example shown in FIG. 8, wherein the disk array comprises $N_d=2$ disks. Assume also there are three streams (stream 1, stream 2 and stream 3). Each stream has a bit rate $S/W_{base}$, where S is the size of a segment retrieved from a disk and thus, the cycle time is $2S/W_{base}$. Three cycles, cycle i, cycle i+1, and cycle i+2, are shown in FIG.

8. In each cycle, there is one I/O transaction for each stream from each disk, for a total of six I/O transactions per cycle. The order of the I/O transactions for the two disks is different in cycle i and cycle i+1. For example, in cycle i, in disk 1, the order of the I/O transactions is stream 1, stream 3, stream 2 (as indicated by the different shadings used for the different streams). Note that the data for stream 1 fetched in cycle i is consumed in cycle i+1 and the data fetched for stream 1 in cycle i+1 is consumed in cycle i+2. Similarly, the data for stream 2 fetched in cycle i is consumed in cycle i+1, etc.

6. The start-up latency incurred by a play-back stream is a function of the I/O cycle length. Indeed, in order to take advantage of sorting, a play-back stream may not begin consumption of the fetched segments before the beginning of the cycle following that in which the segments were fetched. Thus, the longer the cycle length, the longer the latency.

7. The segment size is an important design variable which affects the system performance, and thus must be selected appropriately. The larger the segment size is, the larger is the number of streams of a given data rate that the disk array may serve (as access to the disks becomes more efficient); on the other hand, with the larger segment size and the larger number of streams, the cycle length is larger, and the start-up delay also increases; furthermore, the memory requirements of the buffer to serve all streams increases.

8. The memory requirement is function of the number of disks in the array $N_d$, the number of users to be served, say $N_{max}$, and the segment size S. With complete partitioning of the memory, the memory requirement is given by $2(N_d)(N_{max})S$. With full sharing, the memory requirement is $(N_d+1)(N_{max})S$. If the number of streams to be served is $N_{a1}<N_{max}$, then the above equations hold with $N_{max}$ replaced by $N_{a1}$.

As is evident from the above discussion, a disk is characterized by its storage capacity (i.e., the number of segments that can be stored on the disk), and its I/O capacity (i.e., the number of segments that can be stored or fetched in a given period of time). Typically disks used in an array such as that described above are identical, in that they all have the same storage capacity, and the same I/O capacity.

An alternate scheduling technique disclosed in U.S. patent application Ser. No. 07/977,493, now U.S. Pat. No. 5,581, 784, involves dividing the streams into G groups. The size of each group may be for example $N_{a1}/G$. ($N_{a1}$ is the number of allowed streams where $N_{a1} \leq N_{max}$). The consumption and production cycles of the streams in each group are time aligned with each other, but the consumption and production cycles of each successive group are offset by one $(1/G)^{th}$ of an I/O cycle of duration $N_d S/W_{base}$. FIG. 9 shows the production and consumption cycles for G=8 groups of streams, for the case $N_d=4$ disks.

As shown in FIG. 9, the I/O cycle is divided into G subcycles. In each subcycle of length $N_d S/W_{base} G$, the I/O transactions are performed for the group of streams whose production/consumption cycles begin at the end of the particular I/O subcycle. The group of I/O transactions performed in each subcycle is sorted separately, for example, alternating between increasing and decreasing order of cylinders so as to minimize seek overhead. As $N_d=4$, the number of I/O transactions for a stream served in each subcycle is four. For example, as shown in FIG. 9, for a stream in Group 1, which is served in I/O subcycle #1, there is one segment retrieved from each of the four disks. It should be noted that G can be larger than or smaller than $N_d$. This scheduling technique reduces the amount of buffers utilized. It should also be noted that in the operation described above, all disks experience the same load.

In yet another technique (also disclosed in U.S. patent application Ser. No. 07/977,493) for scheduling I/O transactions in each I/O cycle of duration $N_d S/W_{base}$, the streams are again divided into G groups and the size of each group is again, for example, $N_{a1}/G$. I/O transactions are performed in subcycles of length $N_d S/W_{base} G$. However, instead of retrieving or storing $N_d$ segments for each stream in an entire group of size $N_{a1}/G$, there is retrieved or stored one segment each stream in $N_d$ groups. The segments retrieved or stored are those which begin consumption immediately following the subcycle or which were produced immediately preceding the subcycle. This scheduling technique leads to further reduction in the size of the buffer (e.g., the size of memory 260). In order to keep the load on all disks balanced during each I/O subcycle, it is desirable to guarantee that the segments to be retrieved or stored for each of the $N_d$ groups served in a subcycle come from separate disks.

Consideration is now given to how the disk storage system is able to support streams with different production/consumption rates. While dividing the I/O cycle into subcycles can lower buffer requirements, grouping multiple consecutive I/O cycles into a supercycle can accommodate streams with diverse bandwidth requirements. Consider a disk storage system comprising $N_d$ disks or other storage units which can support $N_{a1}$ streams, each of nominal rate $W_{base}$ bits/sec. The basic scheduling algorithm of fetching one stripe per stream per I/O cycle of duration $N_d S/W_{base}$ is now modified to allow fetching multiple stripes per stream per supercycle where a supercycle comprises $N_{super}$ consecutive I/O cycles. The number of stripes to be fetched in a supercycle depends on the stream rates. This scheduling algorithm can support streams of different rates ranging from a minimum of $W_{base}/N_{super}$ bit/sec to a maximum of $N_{a1} W_{base}$ bits/sec with increments of $W_{base}/N_{super}$ bits/sec. Streams that require rates that do not belong to the above denominations will be assigned a bandwidth of the next higher allowable rates, in which case certain I/O bandwidth is wasted. For example, let $N_{super}=16$, then a stream with rate 1.25 $W_{base}$ bits/sec is allowed to fetch 20 stripes per supercycle, a stream with rate 0.125 $W_{base}$ bits/sec is allowed to fetch 2 stripes per supercycle, and a stream with rate 0.3 $W_{base}$ bits/sec is allowed to fetch 5 stripes per supercycle (although this stream may need to fetch fewer than 5 stripes in some supercycles).

To define the scheduling in more precise terms, let $C_i$ be the $i^{th}$ I/O cycle of a typical supercycle where $i=1, 2, \ldots, N_{super}$. For a particular stream, numbered j, $L_{i,j}$ stripes are allowed to be fetched in the $i^{th}$ I/O cycle. Clearly, $L_{i,j}$ must be an integer between 0 and $N_{a1}$. To satisfy the disk I/O bandwidth constraint for $C_i$ within a supercycle, the sum of $L_{i,j}$ over all j must not exceed $N_{a1}$. To satisfy the continuity constraint for stream j, the sum of $L_{i,j}$ over $i=1, 2, \ldots, N_{super}$ must be greater than or equal to the amount of data, normalized by the stripe size, produced/consumed by stream j in a supercycle. To minimize latency and buffer requirements, it is desirable, for each stream j, to minimize the variance among the set of numbers $\{L_{i,j}\}$ as well as to minimize variance of the $$\sum_j L_{i,j}$$

for all cycles i. The above criteria serve as the basis for admitting and scheduling the data retrieval of a stream.

The choice of $N_{super}$ depends on a number of considerations. A large value of $N_{super}$ provides fine resolution of the streams and hence efficient use of I/O bandwidth. However, it increases start-up latency as well as the complexity of the scheduler. Thus, $N_{super}$ must be carefully selected for the anticipated mixture of stream rates and tolerable start-up latency.

It is an object of the invention to provide an alternative method for operating an array of disks or other storage units. In particular, it is an object of the invention to provide a method for operating an array of disks which has greater flexibility with respect to storage capacity, I/O capacity, and latency of new streams, is robust with respect to the addition of new disks and which minimizes buffer capacity. It is also an object of the invention to provide a method for operating an array of storage units which has advantageous properties with respect to reliability, scalability and multiple bit rates.

SUMMARY OF THE INVENTION

The present invention is directed to a method for operating an array of disks or other storage units to maintain the continuity of a plurality of video streams. The array of disks comprises $N_d$ disks. Video data is stored in the disks or fetched from the disks in segments of size S. However, in accordance with the invention, the I/O cycle duration is no longer restricted to $N_d S/W_{base}$.

For each method for operating an array of disks according to the invention, it is useful to consider the layout of segments on the disk and the scheduling of I/O transactions within I/O cycles.

Each of the methods is characterized by a storage capacity, a streaming capacity, a latency for new streams, and a buffer requirement but also has some features with respect to reliability and redeployment. In general, short I/O cycle techniques have shorter latencies and smaller buffer requirements than long cycle techniques. On the other hand, long I/O cycle techniques provide more efficiency for the scheduling of I/O transactions within a cycle, and thus may result in a greater streaming capacity for a given array of disks. Therefore, the particular operating method selected may ultimately depend on whether maximization of stream capacity is the ultimate goal, or whether storage capacity is the dominant factor and streaming capacity is sufficient.

First, it is useful to consider how the data is laid out on a disk array. As is discussed below, sometimes a disk array is divided into sub-arrays. Thus, the data striping techniques apply to sub-arrays as well as to the array as a whole. Three striping (or sub-striping) techniques may be used. For each file, the data is organized into stripes comprising $N_d$ consecutive segments (or sub-stripes comprising $N_a$ consecutive segments where $N_a$ is the number of disks in a sub-array).

The data is stored in the disks so that it is striped across all $N_d$ disks in an array (or sub-striped across all $N_a$ disks in a sub-array). This may be done in several ways. For example:

1) Each group of $N_d$ or $N_a$ consecutive segments from a file is allocated to the disks in the array or sub-array in a regular cycle pattern i.e., disk 1, disk 2, ... disk $N_d$ (or $N_a$) then disk 1, 2, etc. All of the segments in a stripe or sub-stripe have the same physical address in the corresponding disks.

2) Each group of $N_d$ (or $N_a$) consecutive segments from a file are allocated to the disks in the array or (sub-array) in a regular cyclic pattern, but all of the segments in a stripe (or sub-stripe) do not have the same physical address in their respective disks.

3) Each group of $N_d$ (or $N_a$) segments from a file is placed in the array of $N_d$ disks (or sub-array of $N_a$ disks) so that there is one segment on each disk, but the order varies (e.g. randomly) from one stripe (or sub-stripe) to another.

The various embodiments of the invention are now considered.

I. Wide Array-Short I/O and Consumption Cycles

In this embodiment of the invention, the data files are striped across the entire array of $N_d$ disks using one of the three formats described above. The cycle length is not restricted to $N_d S/W_{base}$. Instead, the cycle length is $N_d' S/W_{base}$ where $N_d'$ is smaller than $N_d$.

The scheduling of I/O transactions with the cycles of length $N_d' S/W_{base}$ may be done in a number of ways. In a first technique, each stream of rate $W_{base}$ has $N_d'$ I/O's from $N_d'$ different disks in each cycle. If the rate of a stream is other than $W_{base}$, the number of I/O's for a stream may vary from this. For example, if a stream has a bit rate of 1.5 $W_{base}$ the number of I/O's for the stream for each cycle alternates between $N_d'$ and $2N_d'$). Consumption of segments retrieved from the disk array in one cycle is restricted to begin no earlier than the beginning of the next cycle. Similarly, production of segments to be stored in the disk array in one I/O cycle is restricted to end no later than the end of the previous I/O cycle. In other words, the gated mode of operation is used. This permits the order of the I/O transactions for the various active streams to be different within different I/O cycles. In general for each stream, if the data segments are cyclically laid out on the disks, the I/O transactions for each stream are cyclic, i.e., they go from disk to disk in a regular cyclic pattern. However, within each I/O cycle there are I/O transactions for many streams and the order of the I/O transactions for the many streams within a cycle may vary. The maximum number of streams depends on the number of I/O transactions which can be scheduled within a cycle. This depends on the layout of the data in the disk array and the pattern of disk accesses by the users.

It should be noted that the cycle length $N_d' S/W_{base}$ does not have to be the same for all streams. For different streams or different groups of streams, the value of $N_d'$ may be different.

In an alternative scheduling technique, subcycling may be used. For example, the active streams may be divided over G groups. The I/O cycles are divided into G subcycles of duration $N_d' S/W_{base}$ G. The consumption and production cycles of the streams in each group are aligned with each other but the consumption and production cycles of each successive group are offset by (1/G) th of an I/O cycle. In each subcycle of length $N_d' S/W_{base}$ G, the I/O transactions are performed for the group of streams whose production/ consumption cycles begin at the end of the particular I/O cycle. The group of I/O transactions performed in each subcycle is sorted separately to achieve the optimum number of I/O transactions with a subcycle. In each subcycle of length $N_d' S/W_{base}$ G, $N_d'$ segments are retrieved or stored for all of the streams in one of the G groups. Alternatively, in each subcycle, one segment is fetched or stored for all of streams in $N_d'$ groups.

In yet another scheduling technique, in order to accommodate streams of multiple bit rates supercycling may be used wherein the length of a supercycle is $N_{super} N_d' S/W_{base}$.

The advantage of using the short cycle technique is that buffer sizes are reduced and that latency is decreased. The cost of the short I/O cycle is less efficient with respect to scheduling I/O transactions within an I/O cycle. Thus, this technique is preferably used when streaming capacity is satisfactory and storage is the dominant factor.

II. Sub-Arrays-Short I/O and Consumption Cycles

In an alternative embodiment of the invention, the array of $N_d$ disks is organized into sub-arrays, wherein each sub-array comprises two or more disks. Preferably each of the disks is identical and the number of disks in each sub-array is the same. In some cases, however, the disks in one sub-array may have a different storage capacity, i.e., a different number of storage bins, than the disks in another sub-array. The video data segments may be striped across the sub-arrays in a number of different ways. For example, the files may be striped across the disks in only one of the sub-arrays. Within this sub-array, the striping may be of any of the three forms described above. Alternatively, the segments may be striped across the entire array, with sub-stripes allocated cyclically to the different sub-arrays. In another alternative, the data is allocated to the disks by randomly allocating sub-stripes to the sub-arrays. The number of disks is designated $N_d$. The number of sub-arrays is designated $N_s$ and the number of disks in a sub-array is designated $N_a$.

A number of different I/O scheduling techniques may be used in this case. For example, in gated operation, the length of an I/O cycle (as well as production and consumption cycles) may be $N_a S/W_{base}$.

In other words, the length of a production or consumption cycle of a stream with bit rate $W_{base}$ is the time it takes the stream to produce or consume a sub-stripe. Thus, in each I/O cycle, for each stream of bit rate $W_{base}$, there is one I/O transaction from each of the $N_a$ disks in one sub-array so that a sub-stripe is fetched from or written to the one sub-array. Depending on how the data is laid out on the disks, in consecutive I/O cycles, for a particular, stream, the I/O transactions may all take place within one sub-array (if the relevant file is striped only across the one sub-array). Or, in consecutive I/O cycles, for a particular stream, the I/O transactions may move in a regular cyclical pattern from one sub-array to the next. If the sub-stripes of a file are randomly allocated to the sub-arrays, then the I/O transactions for a stream which accesses this file move randomly from one sub-array to another in consecutive I/O cycles.

To service a maximum number of users in a sub-array arrangement, it is desirable for groups of streams to be desynchronized from one another, so that in a particular I/O cycle different streams access different sub-arrays. If all of the streams are synchronized and access the same sub-array in the same I/O cycle, then the streaming capacity of the entire array is no greater than that of a single sub-array, although the storage capacity is $N_s$ times greater.

When sub-arrays are used, sub-cycling and super cycling may also be used. For example, a cycle of length $N_a S/W_{base}$ may be divided into G subcycles. In each of the G subcycles, a sub-stripe for all of the streams in one of G stream groups is stored or fetched or one sub-stripe is fetched for all of the streams in $N_a$ subgroups. Similarly, to handle multiple bit rate streams, a super cycle of length $N_{super} N_a S/W_{base}$ may be used. In each cycle i of the supercycle, for a stream j, $L_{i,j}$ sub-stripes for a stream are fetched or stored depending on the bit rate, where $L_{i,j}$ is an integer.

In general, sub-arrays with short I/O cycles are used where storage capacity is the dominant factor and streaming capacity is sufficient.

III. Sub-Arrays-Long I/O Cycles, Short Consumption Cycles

There is no a priori reason why the cycle length must be shorter than $N_d S/W_{base}$ when sub-arrays are used. For example, in particular situations, the cycle length may be longer than $N_dS/W_{base}$. Consider the case where the files are striped across the entire disk array and the disk array is organized into $N_s$ sub-arrays. In this case, the I/O cycle length may be set to $N_dS/W_{base}$. However, the I/O cycle for each sub-array is offset with respect to that of the adjacent sub-array by ($1/N_s$) of the cycle length. The production and consumption cycles of the streams have a length of $N_dS/W_{base}$, and produce segments for or consume segments from the $N_s$ sub-arrays in a round robin fashion. The consumption of segments fetched from a sub-array is restricted to begin no earlier than the beginning of the next I/O cycle for the sub-array. The production of segments to be stored in a sub-array is restricted to end no later than the end of the previous I/O cycle for the sub-array.

This technique is advantageous in that it increases the streaming capacity (long I/O cycle), but suffers from increased latency and increased buffer size (but still smaller than if long consumption/production cycles are used).

IV. Redeployment and Additional Disks

For all of the foregoing disk array operation methods, it is useful to consider what happens when disks are added. In such a case, it is necessary to consider how data is redeployed when new disks are added or what method of operation is to be used after the new disks are added.

The particular redeployment technique and method of operation selected depends on whether the new disks are added to increase streaming capacity (i.e., increases the number of users to be accommodated) or to increase storage capacity in a situation where streaming capacity is sufficient.

BRIEF DESCRIPTION OF THE DRAWING

FIG. 9 illustrates a scheduling technique for I/O transactions in a disk array involving sub-cycling such as described in U.S. Pat. No. 5,581,784.

FIGS. 10A and 10B illustrate a first technique for operating a disk array according to the invention.

FIGS. 11A, 11B, 11C, 11D, 11E illustrate a second technique for operating a disk array according to the invention.

DETAILED DESCRIPTION OF THE INVENTION

The methods for operating a disk access system according to the invention are now considered in greater detail.

I. Wide Array-Short I/O and Consumption Cycles Method

Figure 1:
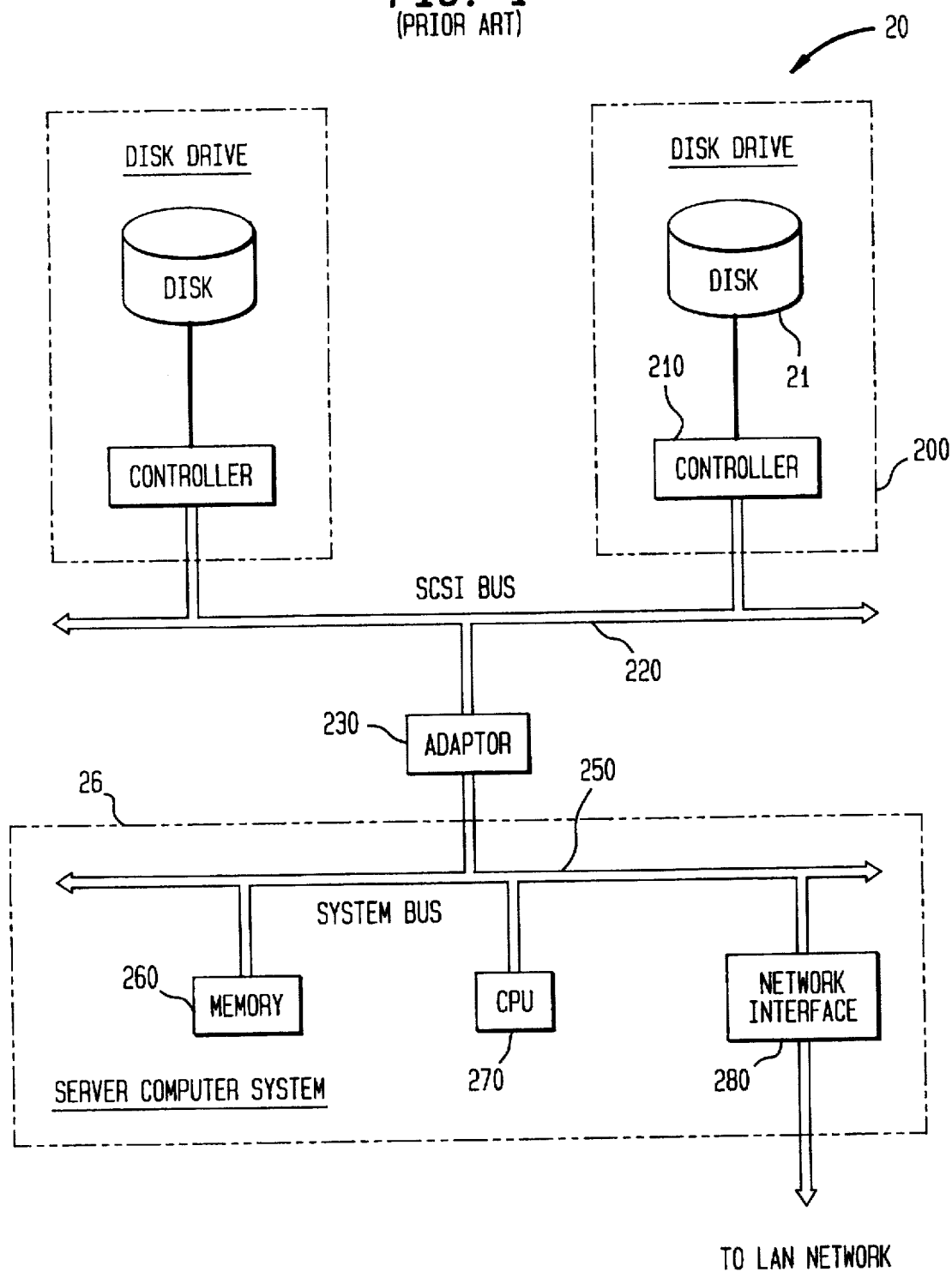
FIG. 1 schematically illustrates a conventional video server including a disk storage system.
Figure 2:
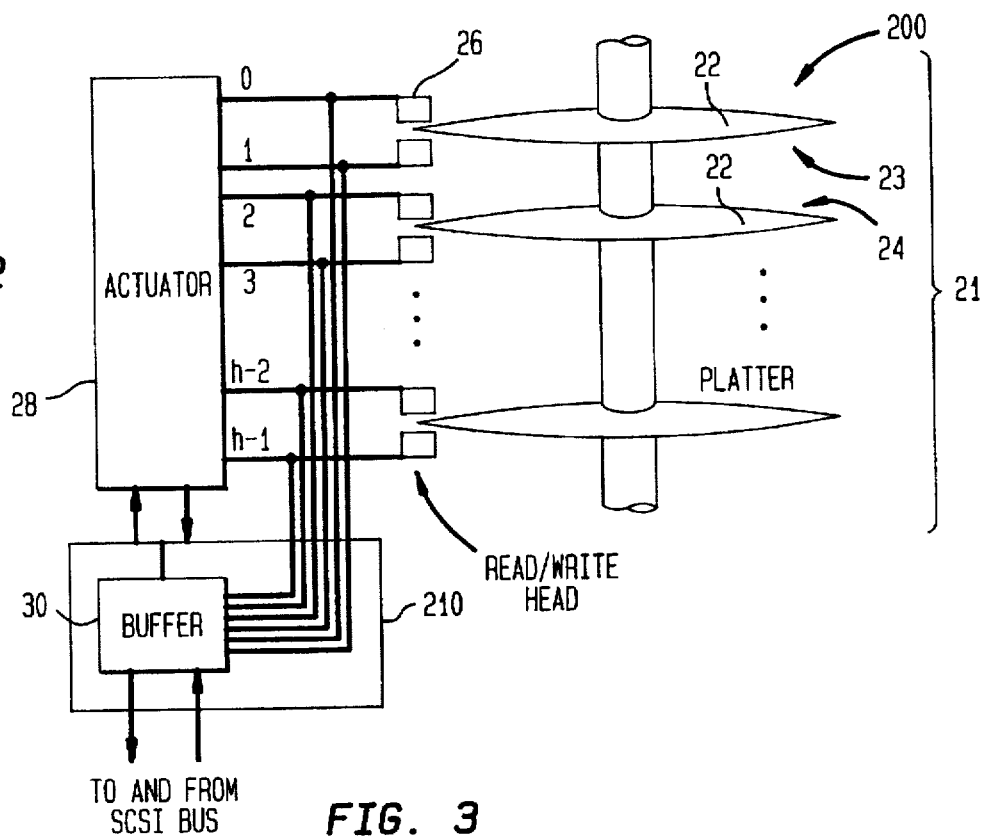
FIG. 2 schematically illustrates a conventional disk drive for use in the system of FIG. 1.
Figure 3:
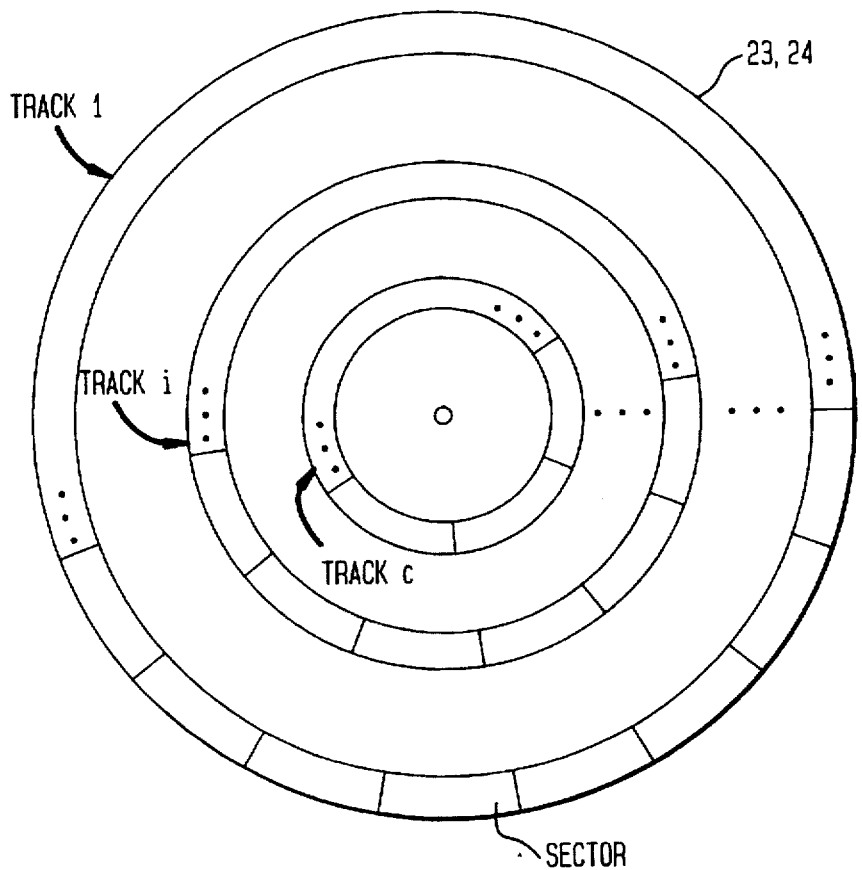
FIG. 3 illustrates the organization of a recording surface of a conventional disk.
Figure 4:
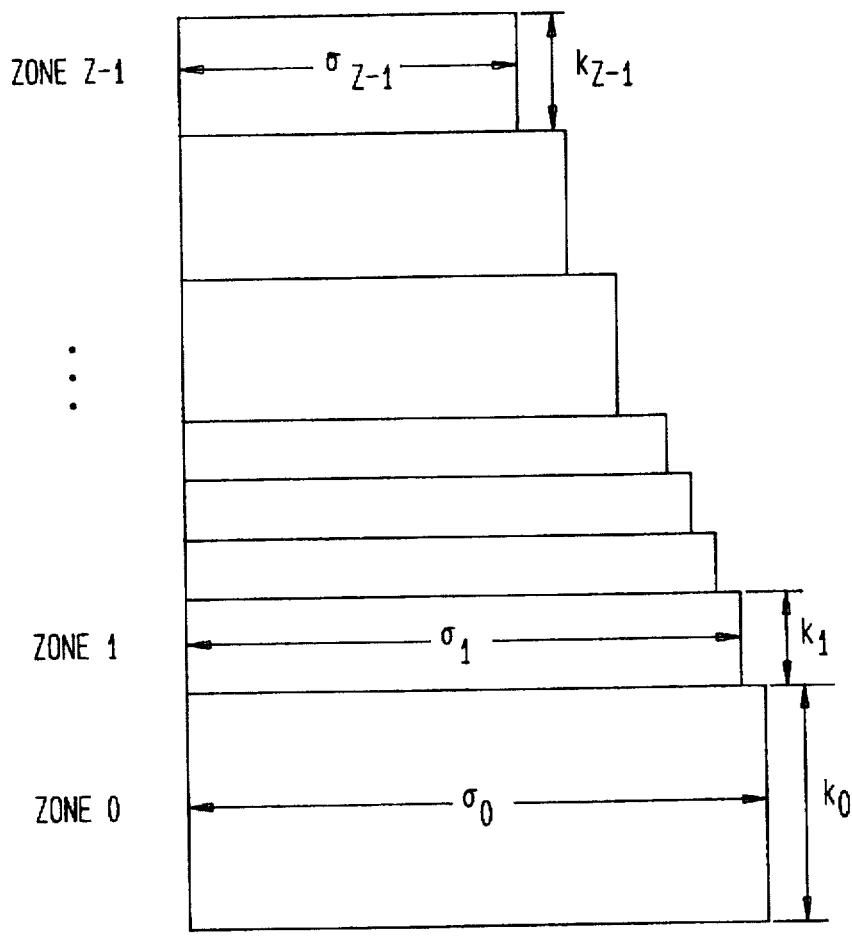
FIG. 4 illustrates the organization of a recording surface of a conventional disk into zones.
Figure 5:
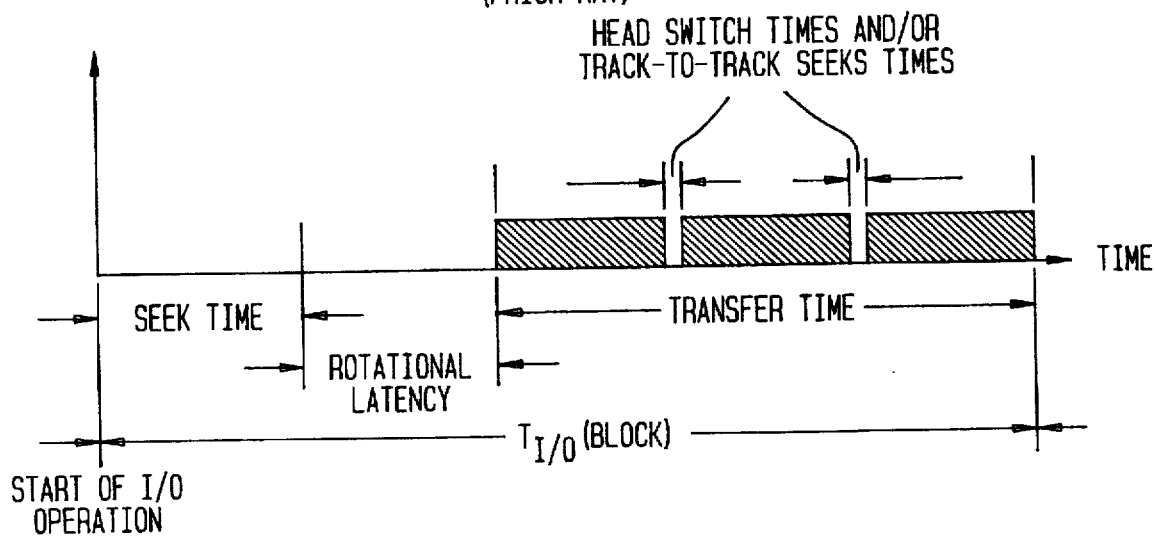
FIG. 5 illustrates the time required to perform a conventional disk I/O transaction.
Figure 6:
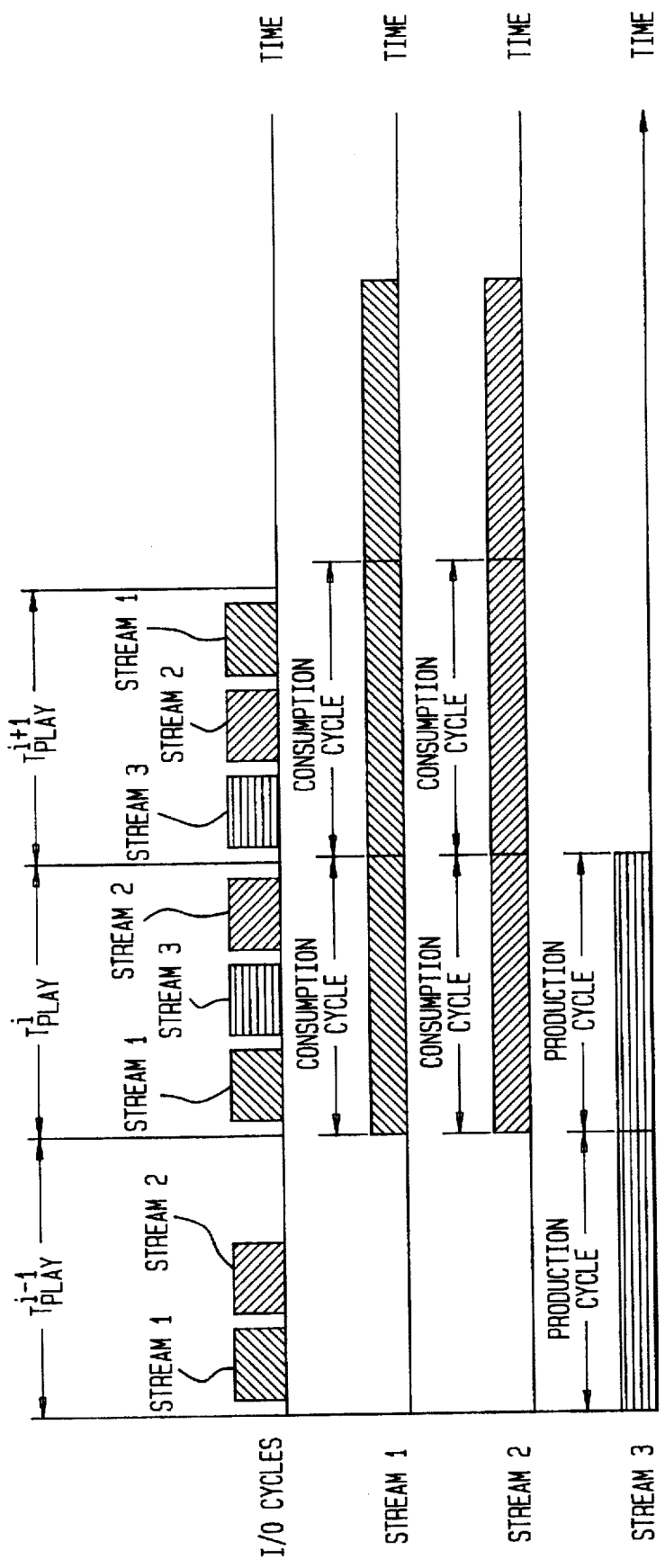
FIG. 6 illustrates the I/O cycles and production and consumption cycles of a disk operated in the gated mode such as described in U.S. Pat. No. 5,581,784.
Figure 7:
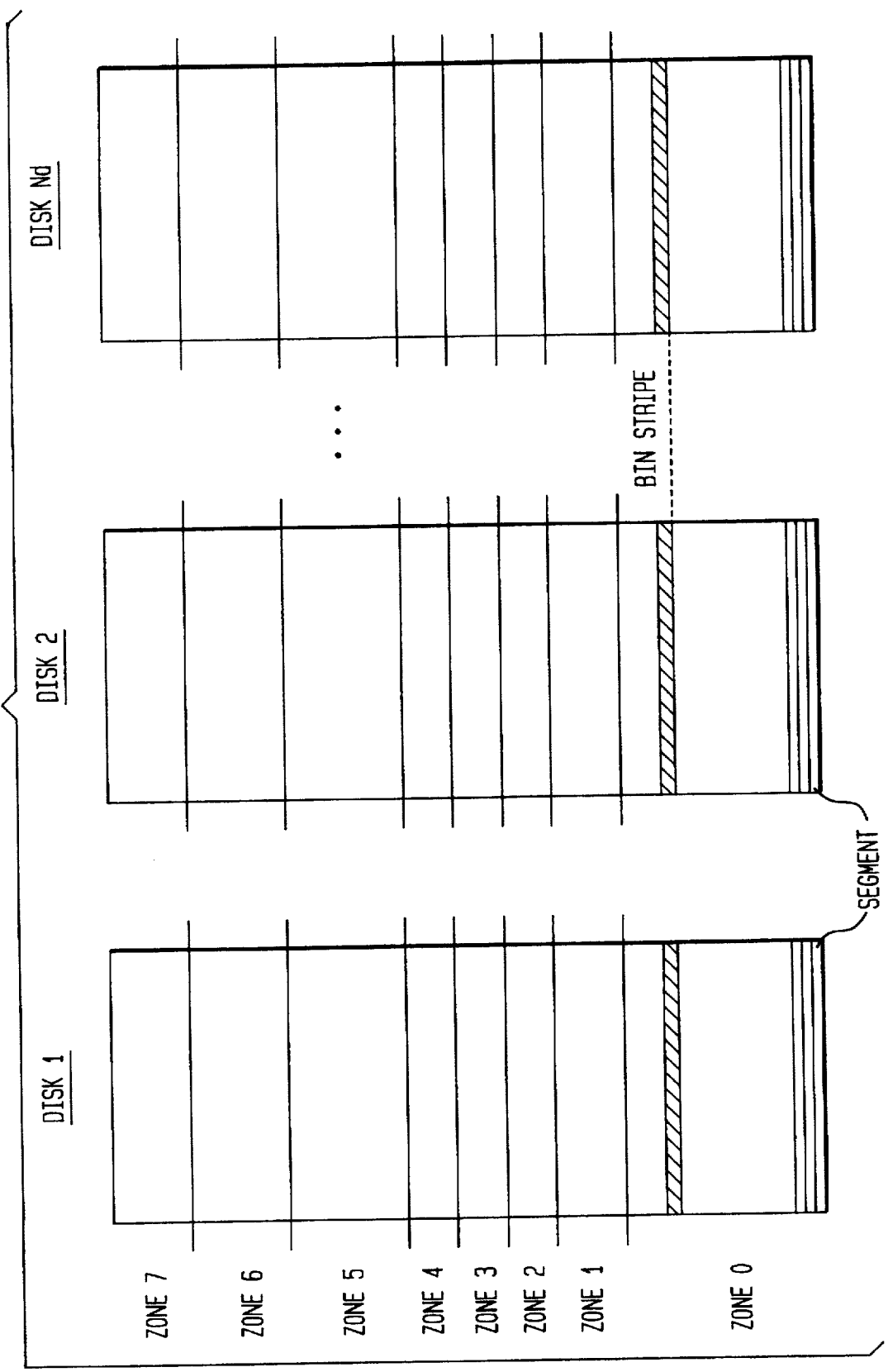
FIG. 7 illustrates the striping of data across an array of disks.
Figure 8:
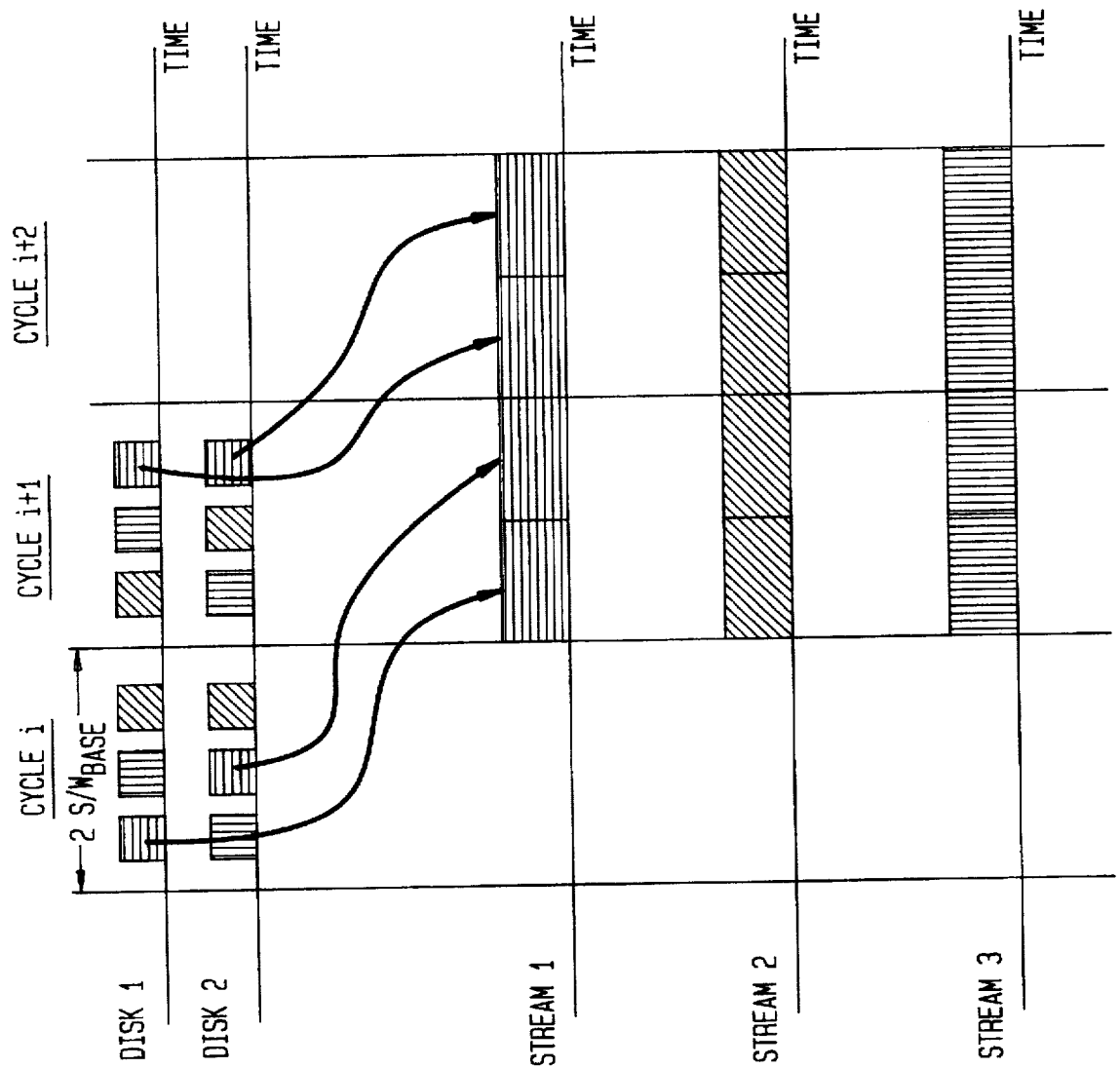
FIG. 8 illustrates a particular scheduling technique for I/O transactions in an array of disks.
Figure 10A:
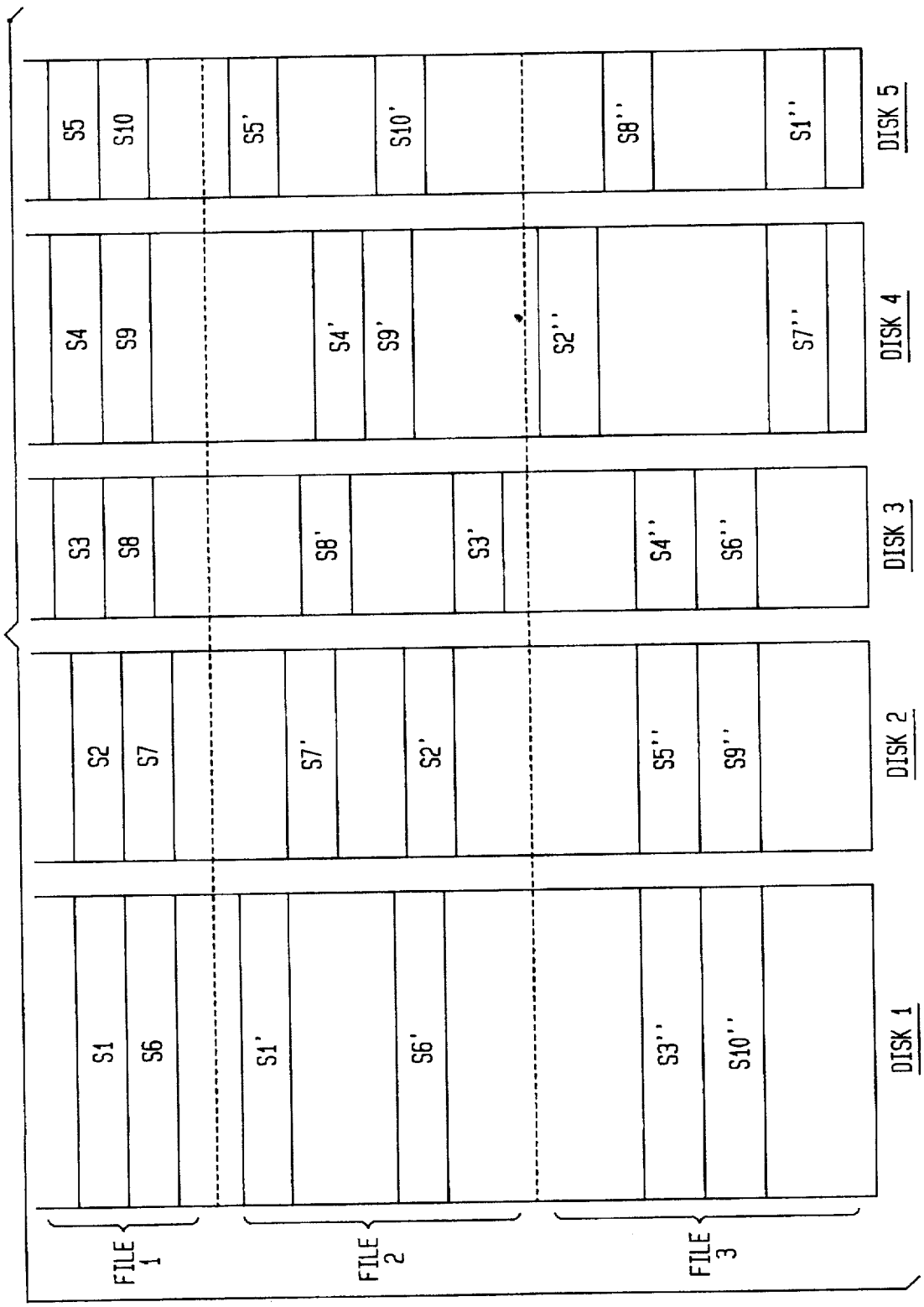

FIG. 10A shows an array $N_d$=5 disks. FIG. 10A shows how the data from three files are striped across the disks. File 1 comprises segments S1–S10. These segments are allocated to the disks in a regular cyclic pattern. The segments S1–S5 form a first stripe and are assigned to disks 1–5, respectively. The respective segments occupy the same physical addresses in the respective disks. The segments S6–S10 form a second stripe and are assigned to disks 1–5, respectively. The respective segments occupy the same physical addresses in the respective disks.

File 2 comprises the segments S1'–S10'. These segments are allocated to the disks in a regular cyclic pattern. The segments S1'–S5' form a first stripe and are assigned to disks 1–5 respectively. The respective segments within the stripe have different, e.g., randomly assigned, addresses within the disks. Similarly, the segments S6'–S10' form a second stripe and are assigned to disks 1–5 respectively. The respective segments within the second stripe have different (e.g., randomly assigned) addresses within the respective disks.

The File 3 contains the segments S1"–S10". The segments S1"–S5" form a first stripe and the segments S6"–S10" form a second stripe. There is one segment from the first stripe assigned to each disk and one segment from the second stripe assigned to each disk. However, the segments within each stripe are not assigned to the disks according to a regular pattern.

FIG. 10B illustrates how I/O cycles are scheduled. Illustratively, $N_d'$=3 so that the cycle length is $N_d'S/W_{base}$= $3S/W_{base}$. Illustratively, there are three streams; stream 1 accesses file 1, stream 2 accesses file 2 and stream 3 accesses file 3. FIG. 10B shows the cycles in which particular segments are accessed and the cycles in which the segments are consumed by particular streams. For example, in cycle i, segments S1, S3" and S1' are fetched from disk 1, segments S2, and S2' are fetched from disk 2 and segments S3 and S3' are fetched from disk 3. The segments S1, S2 and S3 are then consumed by the stream 1 in the cycle i+1. The segments S1', S2' and S3' are consumed by the stream 2 in cycle i+1.

The striping technique shown for file 3 in FIG. 10A is particularly advantageous because when there are many streams (and also possibly many files) the possibility of synchronized streams is reduced. When a large number of streams are synchronized (i.e. have the same pattern of I/O transactions) the number of allowed streams is small.

This short cycle technique is especially useful when the streaming capacity of available disks is larger than the required streaming capacity. It is also used when it is desired to keep the latency short because a short cycle time means a short latency. It is also useful when it is important to keep the buffer requirements low as a short I/O cycle means a smaller buffer. In this technique, the number of required memory buffers is $2N_d' N_{a1}$ with full partitioning and $(N_d'+1)N_{a1}$ with full sharing, where $N_{a1}$, the desired number of allowed streams, is smaller than $N_{max}$, the maximum number of streams which can be handled.

I. An alternative embodiment of the invention is as follows.

Consider an array of $N_d$ storage units. In general, the data may be allocated to the storage units in stripes of $N^*_d$, $N^*_d \leq N_d$ segments. (For example, in an array of $N_d=6$ disks, disk 1, disk 2, disk 3, disk 4, disk 5, disk 6, the data of a particular file may be allocated to $N^*_d=5$ disks such as disk 1,2,3,4, and 5, with a stripe size of five segments so that the data is striped across the five disks). The I/O cycles may then be scheduled in cycles of length $N_d'S/W_{base}$ where $N_d'<N_d$.

II. Sub-Arrays-Short I/O and Consumption Cycles

Figure 11A:
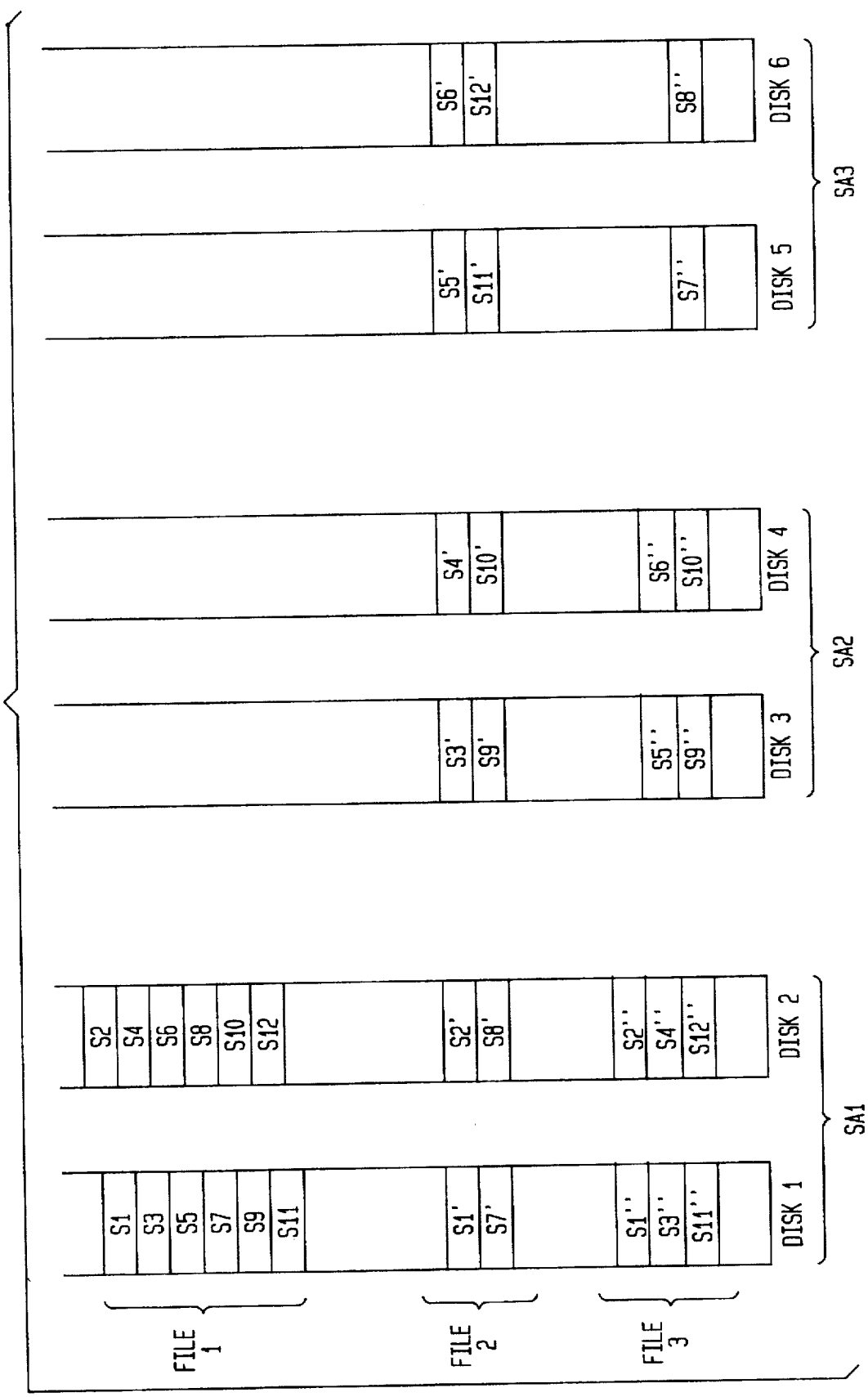

FIG. 11A shows an array of $N_d=6$ disks, labeled disk 1, disk 2, disk 3, . . . , disk 6.

The disks are organized into three sub-arrays labeled SA1, SA2, SA3. Thus, the number of sub-arrays is $N_s=3$. The number of disks in each array is $N_a=2$. A sub-stripe refers to the segments which are striped across a sub-array.

Three files are shown as file 1, file 2 and file 3. File 1, comprising segments S1–S12, is striped across the sub-array SA1. File 2, comprising segments S1'–S12' is striped across all of the arrays. File 3 comprises segments S1"–S12". The sub-stripes are assigned randomly to the sub-arrays.

The basic I/O scheduling algorithm is that the cycle length is $N_aS/W_{base}$. For a stream of bit rate $W_{base}$, in each I/O cycle, one sub-stripe is retrieved from a sub-array. FIG. 11B shows the schedule of I/O transactions for three streams; stream 1 which accesses file 1, stream 2 which accesses file 2, and stream 3 which accesses file 3. The production and/or consumption cycles for the streams 1, 2 and 3 are also illustrated. A gated mode of operation is used. Thus, consumption of sub-stripes is restricted to begin no earlier than the beginning of the next I/O cycle after the I/O cycle in which the sub-stripe is fetched. Similarly, the production of a sub-stripe to be written into the array is restricted to end no later than the end of the I/O cycle prior to that in which the sub-stripe will be written to the disk array.

The resulting stream performance (number of users which can be accommodated) depends on 1) deployment of stripes (or sub-stripes)
2) the particular access pattern (i.e., pattern of files accessed by user)
3) specific scheduling algorithm As indicated above, optimum performance is achieved when the load is balanced across all the disks. If files are allocated to the disks in the manner of file 1, i.e. sub-striped across only one of the sub-arrays, then the stream performance will be very dependent on the access pattern. For example, if a lot of users want files stored in sub-array 1 and not many users want the files stored in sub-array 2, then the streaming performance will be limited by the I/O capacity of disks 1 and 2 in sub-array 1. On the other hand, if the access pattern is such that equal numbers of users access files in different sub-arrays, then an increased number of streams can be accommodated. If all files are like file 3 (random arrangement of substripes to sub-arrays), then in each I/O cycle, there will be on average a balanced load across all sub-arrays.

Figure 11C:
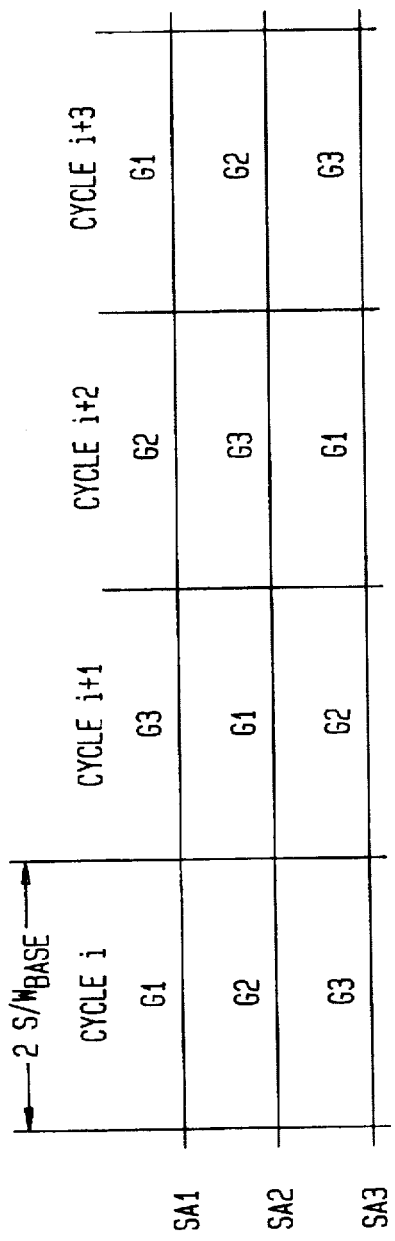

Another factor which effects the stream capacity is as follows. Assume the files are striped across the entire array or that sub-stripes are randomly allocated to sub-arrays. However, if all of the streams are synchronized so that all the streams want to access sub-array 1 in cycle i, sub-array 2, in cycle i+1, etc. then, the streaming capacity is no greater than the streaming capacity of one sub-array and all that the additional sub-arrays provide is additional streaming capacity. What is most desirable is for there to be a plurality of groups of streams which are desynchronized with respect to one another. For example, a first group of streams access SA1, while a second group of streams access SA2 and a third group of streams access SA3. Such a scheduling algorithm is illustrated in FIG. 11C where G1, G2 and G3 indicate the groups of streams. In this manner a high level of streaming capacity is achieved.

In this technique, with full partitioning the buffer requirement is $2N_aN_{a1}$ and with full sharing it is $(N_a+1)N_{a1}$.

It is also possible to use subcycling in this embodiment of the invention. Consider the situation where there are three sub-arrays and G=9 groups of streams.

In a first embodiment of subcycling, each cycle of duration $N_aS/W_{base}$ is divided into G subcycles. The I/O transactions of each sub-group take place in one of the subcycles and consumption cycles for the particular subgroup begin immediately after the corresponding I/O subcycle. The division of an I/O cycle into G=9 subcycles is shown in FIG. 10D. In each subcycle, the streams in one group access the sub-arrays and one sub-stripe is fetched. Consumption cycles for the stream in group G begin immediately after the corresponding subcycle. For example, streams in group G1 have their I/O transactions in the first I/O subcycle and the consumption cycle for G1 begins immediately after the first I/O subcycle.

Figure 11D:
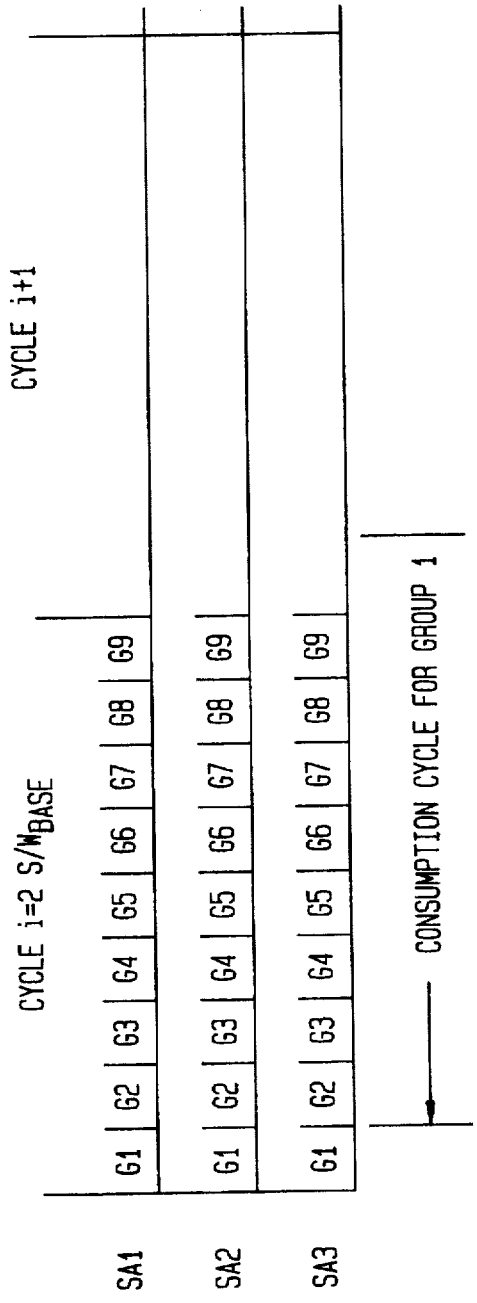
Figure 11E:
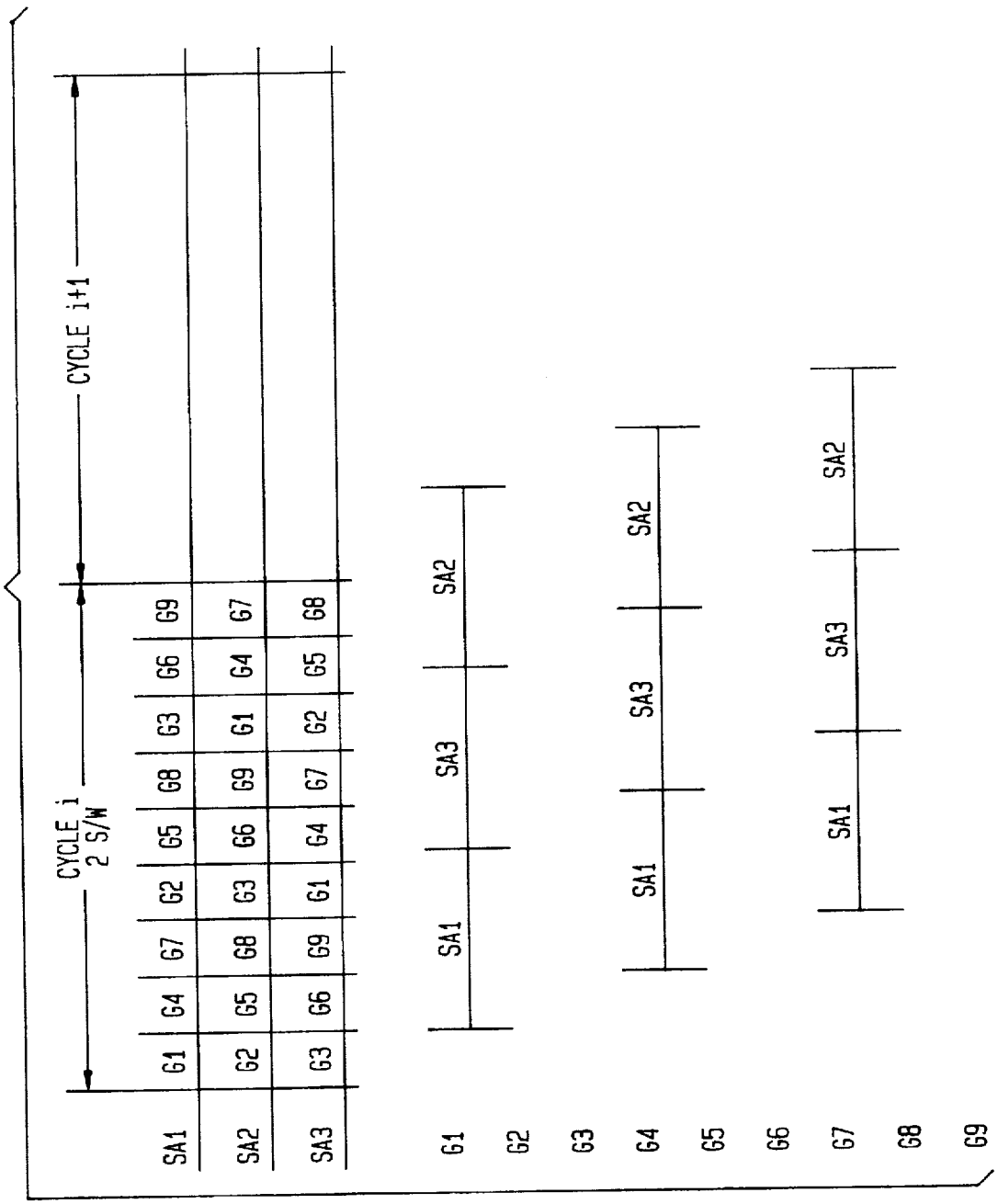

In an alternative subcycle scheduling technique, instead of accessing one sub-stripe from each sub-array for all streams in one group (the case of FIG. 11D), there is retrieved one segment for each stream in three groups. This scheduling technique is shown in FIG. 11E. In FIG. 11E, the I/O cycle is again divided into G subcycles and the scheduling of groups to sub-arrays for I/O transactions is illustrated. In each subcycle, the indicated group accesses a sub-array to fetch or store a sub-stripe. For example, group G1 accesses sub-array (SA) i in subcycle 1, sub-array 3 in subcycle 4 and sub-array 2 in subcycle 7. The corresponding consumption of the fetched sub-stripes for G1, G4, and G7 is also illustrated. It should be noted that the technique of FIG. 11E is applicable to other kinds of storage units besides sub-arrays. For example, the technique is applicable to the case where the storage units are individual disks or other types of random access memory. (In this case in FIG. 11E, SA1, SA2, SA3, represent storage units other than sub-arrays).

III. Sub-Arrays, Long I/O Cycles, Short Consumption Cycles

As indicated above, it is also possible to operate a disk array comprising $N_d$ disks organized into sub-arrays using a long I/O cycle.

Figure 12:
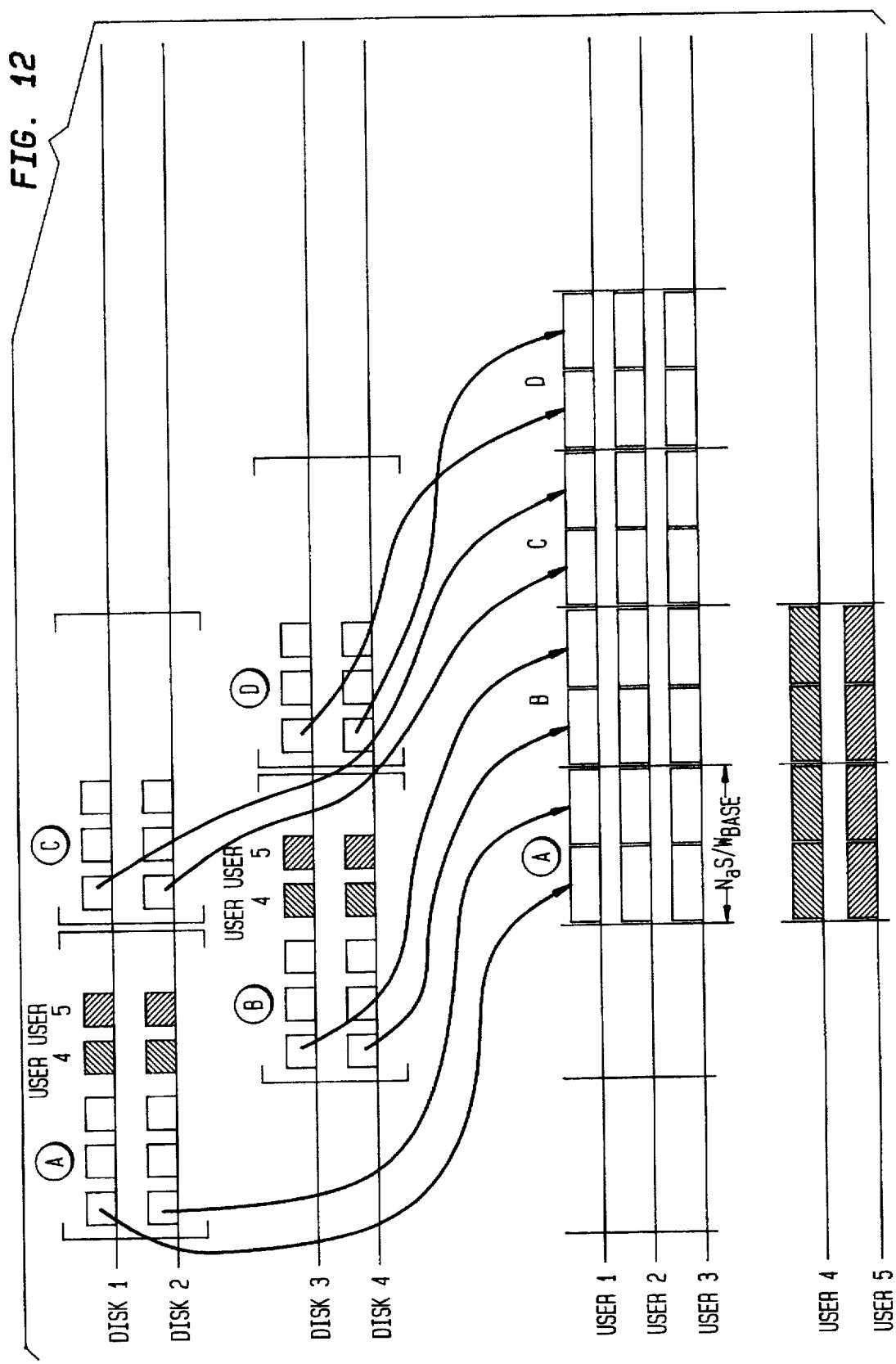
FIG. 12 illustrates a third technique for operating a disk storage system according to the invention.

In this case, the data is assumed to be striped across the entire array. In this case, the I/O cycles have a length $N_sN_aS/W_{base}$. However, the I/O cycles of the different sub-arrays are offset by $1/N_s$ of an I/O cycle from each other. The consumption and production cycles of the streams have a duration $N_aS/W_{base}$. However, consumption is restricted to begin no earlier than after the end of the I/O cycle in which the data is fetched. Similarly, production is restricted to end no later than the beginning of the I/O cycle in which the data is written. FIG. 12 shows an example in which there are four disks, labeled disk 1, disk 2, disk 3 and disk 4. There are also five users or user groups labeled user 1, user 2, user 3, user 4, and user 5.

Recall that in the Wide Array-Short I/O and Consumption Cycles Method, the number of required memory buffers is $2(N_d)(N_{a1})$ with full partitioning and $(N_d'+1)(N_{a1})$ with full sharing. In the Sub-Array-Long I/O Cycles Short Consumption Cycles Method with $N_s$ sub-arrays, the consumption cycles are each equal to $N_aS/W_{base}$ and the number of buffers with full partitioning is $(N_s+1)N_aN_{a1}=(N_d+N_a)N_{a1}$. Furthermore, by considering the consumption cycles to correspond to a single segment ($N_a=1$), the I/O cycles for the $N_s=N_d$ sub-arrays of $N_a=1$ disks are offset with respect to each other by a period of time equal to the consumption of a single segment and the minimum memory requirement under this scheme with full partitioning is reached and is given by $(N_d+1)(N_{a1})$.

If maximizing the number of streams to be served is not the objective, then it is possible to decrease the amount of buffering required below the amount obtained by operating the array as described above (which is $(N_d+N_a)N_{a1}$, where $N_{a1}<N_{max}$ is the desired number of streams). Indeed, if $N_{a1}$ is restricted to $fN_{max}$, where $f<1$, then only $f$ of an I/O cycle is required to perform the necessary I/O's, and by restricting consumption to begin no earlier than the end of the fraction $f$ of the I/O cycle in which data has been fetched, the buffer requirement can be reduced to below $(N_a+1)(N_a)(N_{a1})$. For example, for $N_s=2$, the buffer requirement is $(2+f)(N_a)(N_{a1})$.

In general, the number $N_{max}$ differs for the various techniques but $N_{a1}$ can be set at a desired number less than $N_{max}$ for a particular technique.

IV. Redeployment

To increase the storage capacity of an existing array which operates according to one of the inventive techniques, or according to the technique described in U.S. patent application 07/977,493, now U.S. Pat. No. 5,581,784 new disks are added. The new disks may or may not be identical to the original ones (i.e., may or may not have the same storage and I/O capacities); and may or may not be identical to each other. However, for purposes of clarity, in the examples which follow, the following issues are considered.

(a) how to organize the entire set of disks, old and new;

(b) how to redeploy the data that was already stored on the original array over the entire system; and (c) how to operate the new system in order to meet the same continuity requirements underlying the serving video streams.

A. Adding New Disks to Make the Array Wider (a) The new disks are added to the original array so as to form a wider array. The new array is of width $N_{old}+N_{new}=N_{total}$ (b) The segments are redeployed so as to be striped across all disks.

(c) The new array may then be operated according to one of the techniques described above.

Because the goal behind redeployment of the segments is to achieve load balancing, it is important to make sure that for each stream, in any set of $N_{old}+N_{new}=N_{total}$ consecutive segments, there is one segment on each disk.

This may be accomplished using one of the following redeployment methods.

Redeployment Method A1

In this redeployment method, stripes are redeployed by physically moving them to accommodate the new disks. The array is re-striped on a file-by-file basis. Each file can be considered to be an array of segments reorganized into larger stripes. The $i^{th}$, $i=0, 1, 2 \ldots$, new stripe for the new, larger array is made by copying segments $N_{total}*(i-1)+i$ through $N_{total}*i$ to the new stripe. Because the new array is larger than the old array, there is no possibility that the copying of the segments will overwrite data that hasn't yet been copied. The resultant set of segments for the file contains fewer stripes than the old array did. Any stripes that were allocated to the file that are no longer needed are returned to the free list.

This redeployment method results in a system where the location of a segment merely requires the maintenance of a map of stripes for each file. Locating the $i^{th}$ segment is accomplished by walking through the map entries for the first $\lfloor i/N_{total} \rfloor$ stripes for the specified file, then addressing the $i \bmod N_{total}$ segment. The stripe map entries are extremely simple in structure. (The brackets $\lfloor \; \rfloor$ indicate "integer part of".)

The major drawback to this scheme is that while the stripes are being copied, the array is vulnerable to corruption should the redeployment fail for some reason. To solve this problem, the progress of the redeployment needs to be carefully logged on the array. To maintain complete fault-tolerance, each stripe requires a log operation, resulting in extremely long redeployment times. An alternative to this would be to log the redeployment of each separate file, but this will result in a single file being corrupted should the redeployment crash.

Redeployment Method A2

A second redeployment method relies on the fact that a "stripe" need not be made up of segments that all have the same physical address on each of the disks in the array (as the redeployment method A1 did). To redeploy the stripes, the same segments that would have been copied in method A1 are copied to the new disk, but the rest of the segments remain where they are. New stripes are now formed by mapping the array of segments making up each file into stripes that contain a segment from each of the disks in the array. Free stripes are created out of the segments that were copied to the new disks. As with the first method, redeployment takes place on a file-by-file basis.

This method requires a map of segments, rather than just a map of stripes, for each file, which takes more space to store and is slower to resolve to a disk address.

However, this method is considerably more fault-tolerant than the first method. This is because the redeployment can take place in two distinct phases. First, all of the appropriate segments are moved to the new disk. This phase takes a long time, which makes it more vulnerable to failure. Second, the new segment map is computed and written to disk. This phase is extremely short. The array is only vulnerable to failure during the second phase, which is very easy to log and recover from. If the system crashes during the first phase, the first phase can merely be repeated from the beginning with no ill effects.

Figure 13A:
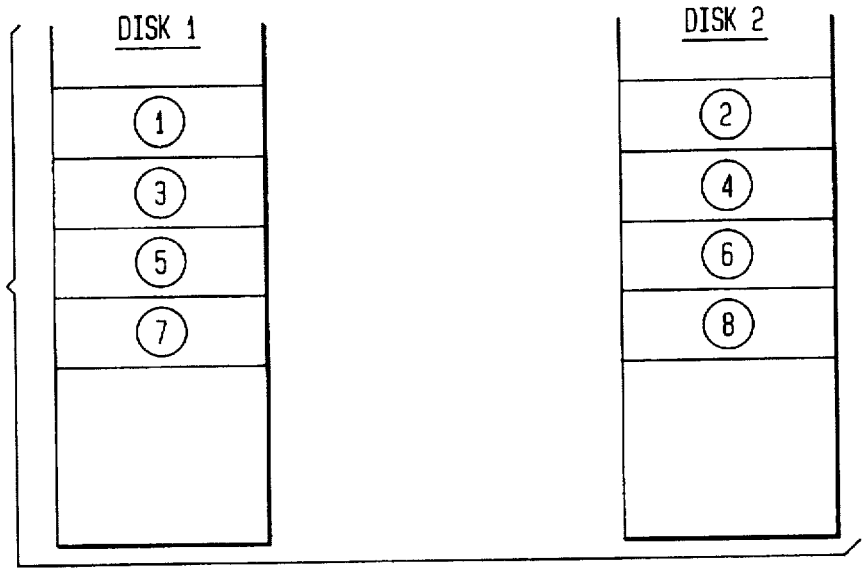
FIGS. 13A, 13B and 13C illustrate a redeployment technique according to the invention.
Figure 13B:
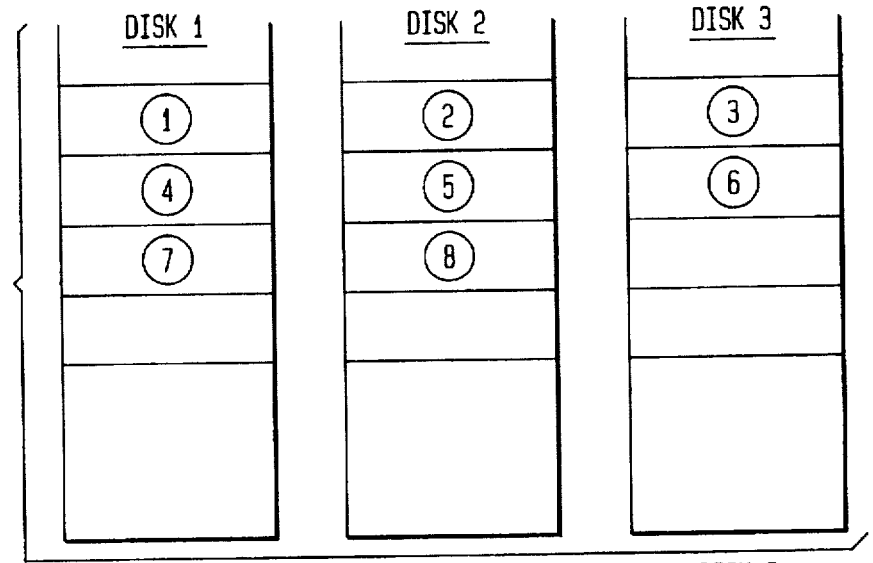
Figure 13C:
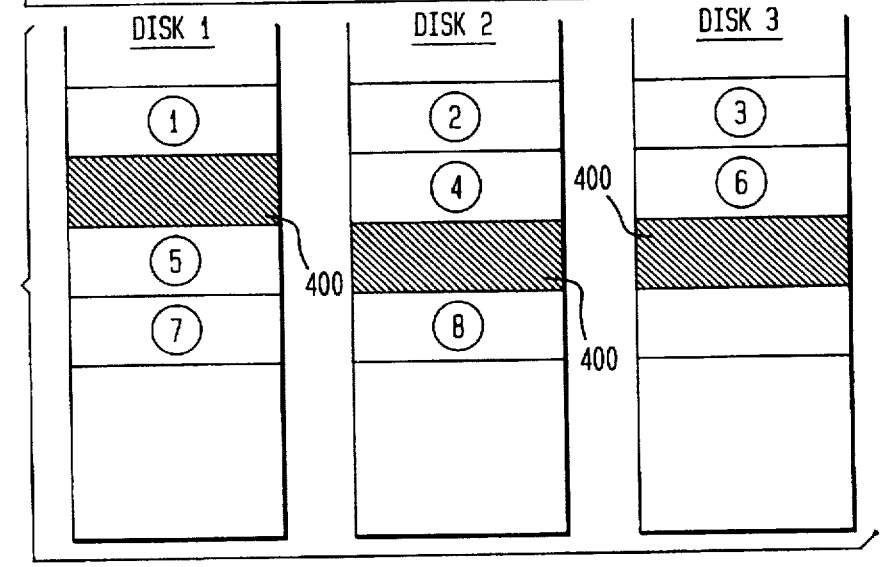

Consider the following example shown in FIGS. 13A, 13B and 13C. FIG. 13A illustrates an original array comprising two disks (disk 1 and disk 2). This disk array is expanded to have three disks (disk 1, disk 2, and disk 3).

As shown in FIG. 13A, a group of segments (segments 1 through 8) are cyclically striped across the two disks of the original disk array. The first redeployment method (Method A1) is shown in FIG. 13B. The segments are rearranged so that they are cyclically striped across the new expanded disk array. The second redeployment method is shown in FIG.

13C. In this case, only segments 3 and 6 are moved to disk 3 and the remaining segments stay in the same locations. Note that any three consecutive segments are spread over the three disks, but three consecutive segments are not necessarily in three consecutive disks (e.g., segment 4—disk 2, segment 5—disk 1, segment 6 disk—3). This insures the load on the three disks is equal. In FIG. 13C, space for new data 400 is indicated by the shading.

The new disk array is operated according to any of the techniques described above (e.g., wide-array, short I/O and consumption cycle, dividing into sub-arrays, etc.). With this method it is possible to use the full streaming capacity of the wider-array; that is the number of streams that can be served increases according to the results obtained in FIG. 15.

It is possible to limit the increase in the cycle length (and hence the start-up latency) by using a smaller segment size. (Note that only submultiples of the original segment size should be considered to minimize the effort underlying redeployment.) For example, if $N_{new}=N_{old}$, it is possible to redeploy the data onto the $N_{old}+N_{new}$ disk array using half the original segment size, thus keeping the stripe size the same as before, and keeping the cycle length the same. The same amount of data is consumed (or generated) by each stream, but the data is fetched from an array twice as wide, and in segments half the original size. In this case, the buffer requirement is also kept from increasing. Note however, that, with a smaller segment size, the increase in the maximum number of users that can be served is smaller than with the segment size. (See FIG. 15)

Recall that if the I/O throughput for all disks is not the same, then the disk with the smallest I/O throughput dictates the serving capacity of all other disks and thus of the disk array.

B. Adding New Disks Without Making Array Wider (a) The new disks are added to the original array so as to form a "taller" array; i.e., increasing the number of stripe bins in the system, but keeping the width of the stripe bins the same.

b) When this method of adding disks is used, the array is divided into sub-arrays for operation. The size $N_a$ of each sub-array in the new system is equal to the stripe size in the original system.

(c) Original stripes may be redeployed so as to be randomly spread over all existing bins, redeployed to be cyclically allocated to the sub-arrays or the original stripes may be left in their original locations and new data placed in the new stripe bins.

If the disk array originally had $N_d$ disks and data was striped across the array, the number of disks may now be increased to $N_s N_d$, where $N_s$ is the number of sub-arrays. However, the stripe size remains $N_d$ segments and is not increased to $N_s N_d$ segments. Similarly, the I/O and consumption/production cycles are $N_a S/W_{base}$.

A major advantage of this method is that the full storage capacity of the added disks can be used regardless of whether it is the same as or different from the original disks.

Given the random deployment of data stripes over all stripe bins (old and new), the number of I/O transactions that a particular disk has to perform in a cycle is random, and varies from cycle to cycle. In all cases, however the number of I/O transactions cannot exceed the number of users being served. Thus the maximum number of users that can be served is at least equal to the number that the old system could serve, provided that the new disks are at least as fast as the original ones. (Clearly, if they were slower, then a decrease in the serving capacity of the system would ensue). The maximum number of users that can be served in the new system may be larger than the original maximum, and is determined for a given probability that the number of I/O transactions scheduled for a disk get accomplished in the cycle. (For example, see the curves in FIG. 16 which show the increase in the number of users that can be served assuming that the new disks that are added are identical to the original ones.) The maximum number of users that can be served, however, cannot reach the value obtained with a wide array long cycle technique (e.g., cycle length equal to $N_{total} S/W_{base}$) which utilizes the entire serving capacities of all disks, old and new. The redeployment techniques which may be used with this method are considered in greater detail below.

Redeployment Method B1

This redeployment technique assumes the goal of adding disks is merely to increase storage capacity, rather than getting more streams to run simultaneously. Instead of widening the array, the number of stripes in the existing array is increased by "stacking" some multiple of the original $N_d$ disks to create an array with the same number of segments per stripe but more stripes. Each of the new stripe bins on the new disks is just added to the free list.

This method only requires a simple stripe map, rather than a larger and more complicated segment map, to locate segments on disk.

The stacking method is very robust because the only I/O required to redeploy is to append new stripe bins to the list of free stripe bins. This updating of the map is easy to make fault-tolerant.

Redeployment Method B2

This redeployment technique (B2) uses the same stacking algorithm employed in the first technique (B1), but it also assumes that some modest increase in the number of simultaneous streams is desired. To do this, the new drives are stacked, but then enough stripes from the old array are moved to the new parts of the array to guarantee a balanced load across all of the drives. Stripes that are copied are returned to the free list. To further guarantee even loading across the different stack elements, an equal portion of the stripes from each file must be copied. During redeployment, the structure of the free list is such that new stripes will be allocated evenly across the different stack elements.

The method for locating segments on disk is the same as method B1.

Redeployment using this method has the same fault-tolerance characteristics as method A2: There is a long first phase of activity where stripes are being copied from one part of the stack to another. If this operation fails, it is easy just to start over. The second phase, updating the stripe map, is short in duration and easy to log to ensure fault tolerance.

Figure 14A:
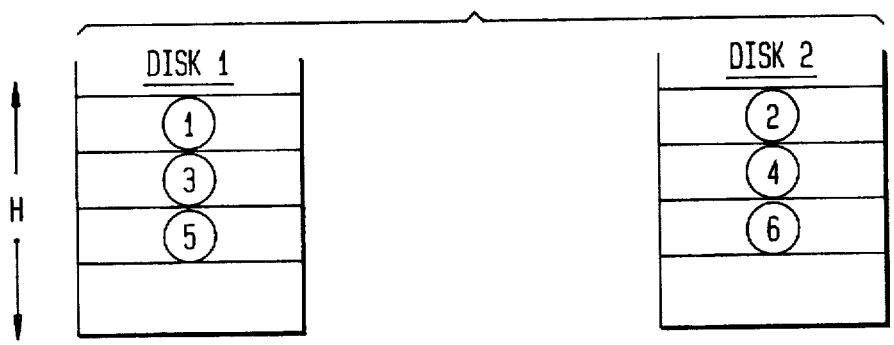
FIGS. 14A, 14B and 14C illustrate a second redeployment technique according to the invention.
Figure 14B:
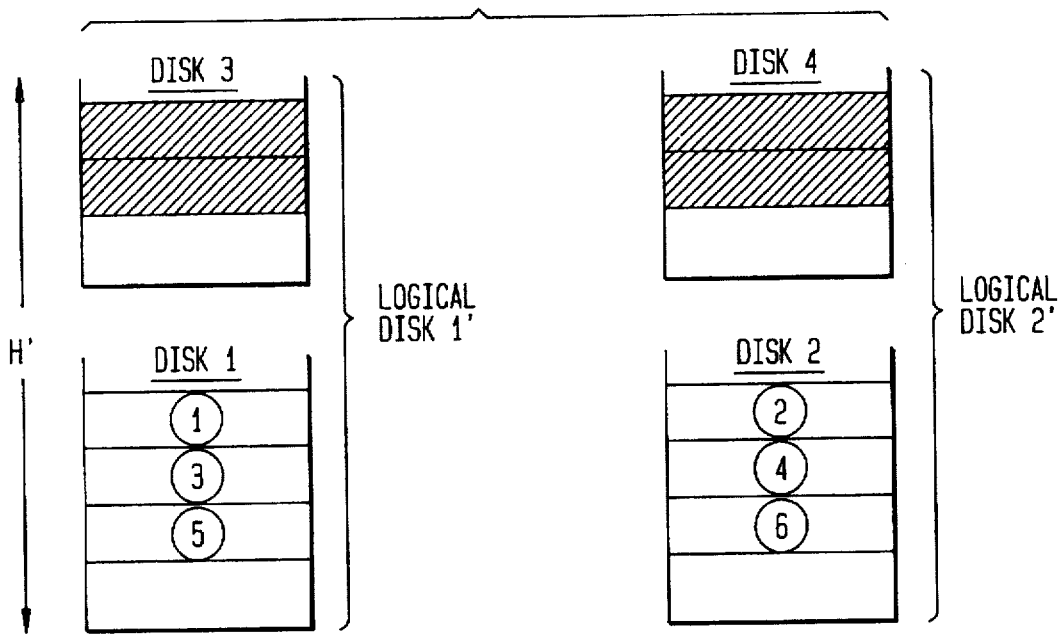
Figure 14C:
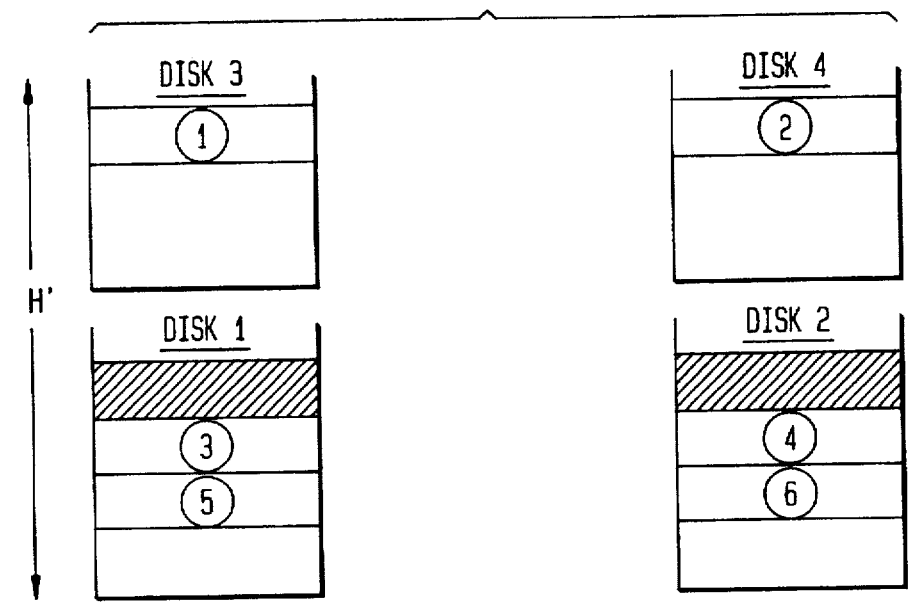

The redeployment techniques B1 and B2 are illustrated in FIGS. 14A, 14B, and 14C. FIG. 14A illustrates an array of $N_{old}=2$ disks (disk 1 and disk 2). The height (i.e., number of stripe bins) of the disks is H. Six segments labeled 1, 2, 3, 4, 5, 6 are shown as cyclically striped across the array. FIG. 14B shows how the capacity of the array is expanded by adding additional disks 3 and 4. Disk 3 and disk 4 are added in a way to increase the height (i.e., number of stripe bins) from H to H', but the width $N_{old}$ of the array remains the same.

There are two ways that data can be redeployed across the entire system (new and old disks). The first way as shown in FIG. 14B is to keep all the old data in the old disks and just put the new data in the new disks. The problem with this technique is that the load is not balanced across all disks because the stripes are not randomly distributed across all stripe bins.

This problem is corrected in the arrangement of FIG. 14C wherein the data from the old disk is distributed across the entire system so that there is a balanced load across all of the disks.

Note that the cycle length in this method does not increase, and is limited by the slowest disk in the system. Hence, one advantage with this method is the bound on latency.

If the new disks have a different capacity than the old ones, since the stripes are randomly spread over all bins, the frequency of access to the new disks is also different from that of the old disks. For example, if the new disks are twice as large as the old ones, then they are twice as likely to be accessed. Accordingly, the maximum number of users that can be served with a given probability of success is dependent on both the storage capacity and the bandwidth of the new disks in relation to the old ones.

Numerical Results

Figure 15:
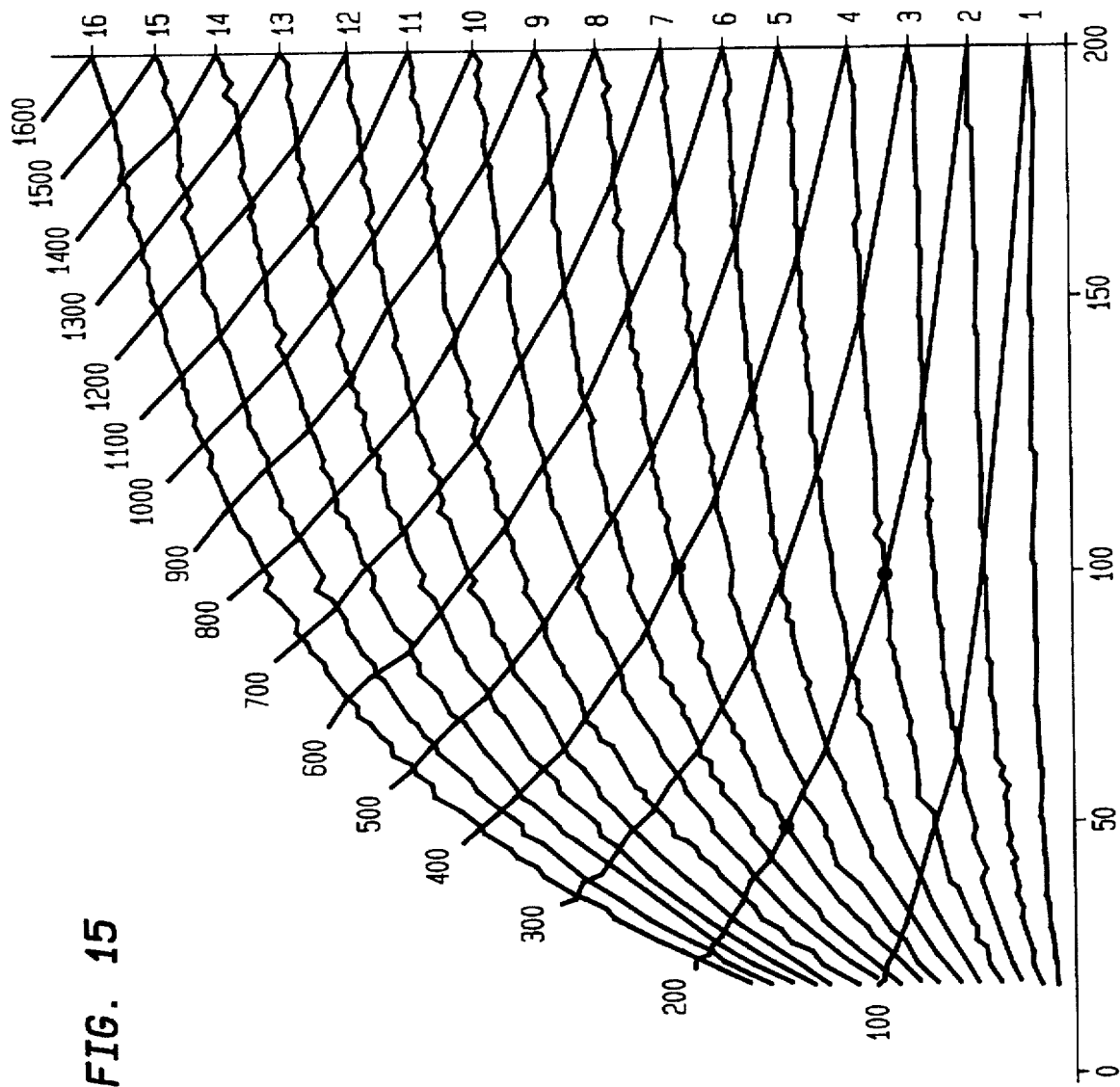
FIGS. 15–16 are numerical results for the inventive technique.

In FIG. 15 there is plotted two sets of curves. The first set corresponds to the maximum number of streams that can be served as a function of the segment size for different number of disks $N_d$ and when data is striped across all disks and when I/O and consumption cycles are $N_d$ $S/W_{base}$. The second set of curves corresponds to a constant stripe size, which is directly related to the cycle length and thus the latency.

For a given number of disks, the number of streams that can be served increases with the segment size, and so does the stripe size and thus the latency.

For a given segment size, the number of streams that can be served increases with the number of disks, and so does the cycle length and thus the latency.

Moving along a constant stripe contour, one sees the increase in the number of streams as a result of increasing the number of disks and decreasing accordingly the size of segments so as to maintain the cycle length constant. Note that, for a given increase in the number of disks, the increase in the number of streams maintaining the stripe size the same is not as large as the increase in the number of streams maintaining the segment size the same. Thus there is a penalty for having to maintain the cycle length the same.

Figure 16:
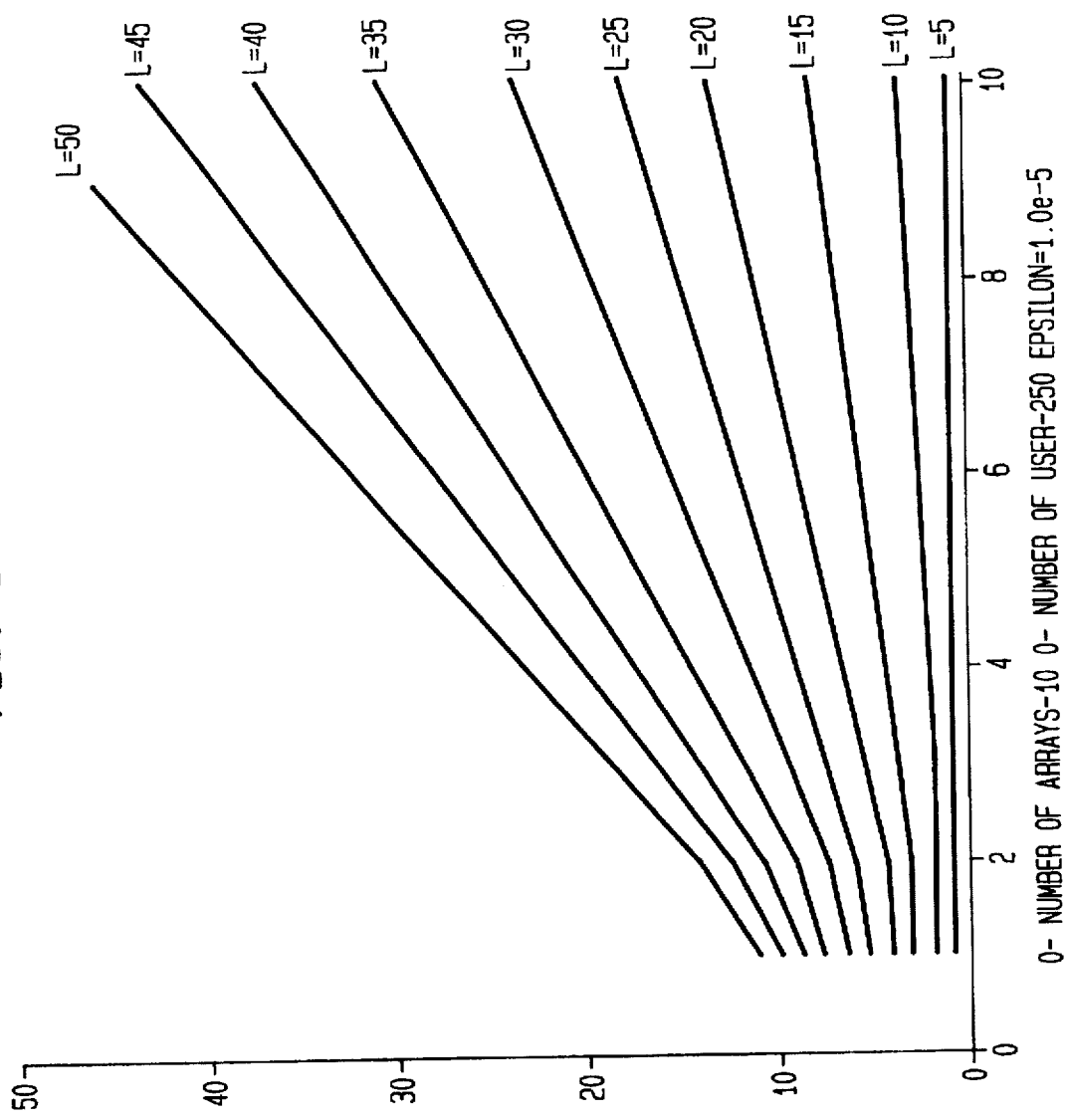

In FIG. 16, we consider the Sub-Array-Short I/O and Consumption Cycles Method with random allocation of data stripes to stripe bins, and plot the number of streams that can be supported for a given probability of success as a function of the number of sub-arrays that are stacked up. In this figure, it is assumed that all sub-arrays are identical. Each curve corresponds to a given streaming capacity for a single sub-array. From this figure, it is possible to see that, for example, if the streaming capacity of one sub-array is 50 streams, then with two such arrays, the number of streams is increased from 50 to about 65, and with 4 such arrays, the number of streams is increased to about 115, all with a probability of missing serving all requests in a cycle equal to 1 in 100,000 (1.0 e-5).

Reliability

In general, reliability in the event of a disk failure in an array is achieved through use of a parity disk. Consider the case of an array of $N_d$ disks and where the data is striped across all disks. To provide protection in the event of a disk failure, a parity disk is provided. Each segment in the parity disk is derived by applying an XOR (exclusive-or) operation to the corresponding segments in all of the $N_d$ disks. Thus, the first bit of segment i in the parity disk is generated by applying XOR to the first bit in segment i of each of the $N_d$ disks, etc.

The problem with using a single parity disk is that a lot of I/O's are needed in the event a disk failure requires use of the parity disk to reconstruct the segments in the failed disk. If one of the $N_d$ disks fails, to reconstruct each segment in the failed disk, it is necessary to perform one I/O in each of the $N_d-1$ functioning disks and one I/O in the parity disk.

The number of I/O's may be reduced according to the present invention. Specifically, the array of $N_d$ disks is divided into a plurality (e.g., 2) of subsets. There is one parity disk associated with each subset.

The segments in each parity disk are derived only from the corresponding segments of the disk in the associated subset.

Now the number of I/O operations used to reconstruct the segments of a failed disk is reduced. To reconstruct one segment of a failed disk in a subset, I/O transactions are performed only in the functioning disks in the subset and in the parity disk associated with the subset.

Conclusion

A method for operating an array of storage units such as an array of disks has been disclosed. The method permits the continuity of a plurality of simultaneous video data streams to be maintained.

It should be noted that different ones of the disclosed techniques can be used simultaneously in the same array of disks or other storage units. Consider an array of $N_d$ disks. Different files can be striped across different numbers of disks. In general, a file is striped across $N^*_d$ disks. $N^*_d \leq N_d$. I/O transactions are scheduled in a sequence of I/O cycles having a length $N_c S/W_{base}$. If a stream has a bit rate $W_{base}$, there are $N_c$ I/O transactions of one segment each in each cycle. It should be noted that $N_c$ may be greater than, equal to or smaller than $N^*_d$. If $N_c$ is equal to $N^*_d$, there is one I/O transaction from each of the $N^*_d$ disks in a cycle for the stream. If $N_c$ is greater than $N^*_d$, there may be more than one I/O transaction from certain disks in a cycle. If $N_c$ is smaller than $N^*_d$, some of the $N^*_d$ disks will not be accessed in an I/O cycle. If the bit rate is smaller than $W_{base}$, the stream has fewer than $N_c$ I/O transactions in one I/O cycle. If the bit rate is larger than $W_{base}$, the stream has more than $N_c$ I/O transactions in one I/O cycle.

Finally, the above described embodiments of the invention are intended to be illustrative only. Numerous alternative embodiments may be devised by those skilled in the art without departing from the spirit and scope of the following claims.

We claim:

1. A method for operating an array of $N_d$ storage units which is organized into $N_s$ sub-arrays of $N_a$ storage units,
   wherein data from one or more fries is striped across the entire array, with one segment in each stripe being allocated to each storage unit,
   said method comprising the steps of defining a sequence of I/O cycles having a duration determined according to the equation $N_s N_a S/W_{base}$, where $W_{base}$ is a bit rate, and scheduling I/O transactions by determining which segments are to be fetched or stored within said I/O cycles to maintain the continuity of a plurality of data streams, the I/O cycles of each sub-array being offset from that of an adjacent sub-array by $(1/N_s)$ of an I/O cycle, said streams having production or consumption cycles having a duration of $N_aS/W_{base}$ and produce segments to be written into or consume segments from the $N_s$ sub-arrays in a cyclic pattern, wherein the consumption of segments fetched from a sub-array in a particular I/O cycle is restricted to begin no earlier than the beginning of the next I/O cycle for the sub-array and the production of segments to be written into a sub-array in a particular I/O cycle is restricted to end no later than the end of the previous I/O cycle for the sub-array.

2. A method for operating an array of $N_d$ storage units wherein data from each of a plurality of files is stored in the storage units in segments of S bits and striped across $N^*_d$ storage units where $N^*_d \leq N_d$ and where $N^*_d$ is different for different files, said method comprising the steps of defining a sequence of I/O cycles having a duration determined according to the equation $N_cS/W_{base}$, where $N_c$ is an integer and $W_{base}$ is a base rate of bits per second, and scheduling I/O transactions by determining which segments are to be stored in or fetched from said storage units in said I/O cycles so as to maintain the continuity of a plurality of streams, a stream having a bit rate $W_{base}$ having $N_c$ I/O transactions in said storage units in each cycle, a stream having a bit rate larger than $W_{base}$ having more than $N_c$ I/O transactions in said storage units in each cycle and a stream having a bit rate smaller than $W_{base}$ having less than $N_c$ I/O transactions in each cycle.

3. A method for operating an array of $N_d$ storage units wherein data from a plurality of files is stored in said storage units in segments of S bits, wherein $N^*_d$ consecutive segments from a file are allocated to $N^*_d$ of said storage units where $N^*_d < N_d$, said method comprising the steps of defining a sequence of I/O cycles having a duration determined by the equation $N_d'S/W_{base}$, $N_d' < N_d$ and scheduling I/O transactions by determining which segments are to be fetched or stored within said I/O cycles to maintain the continuity of a plurality of data stream, a stream with a bit rate $W_{base}$ having $N_d'$ I/O transactions in each I/O cycle.

4. The method of claim 3 wherein $N^*_d$ is different for different files.

5. A method for operating an array of $N_d$ storage units, wherein data from a plurality of files are stored in said storage units in segments of S bits, wherein $N_d$ consecutive segments from a file are allocated so that there is one segment on each of the $N_d$ storage units, said method comprising the steps of defining a sequence of I/O cycles having a duration determined according to the equation $N_d'S/W_{base}$, $N_d' < N_d$, wherein $W_{base}$ is a base rate of bits per second and scheduling I/O transactions by determining which segments are to be fetched or stored within said I/O cycles to maintain the continuity of a plurality of data streams, during one I/O transaction, a stream with a bit rate of $W_{base}$ fetching from or storing to each of $N_d'$ storage units one segment in each I/O cycle, and during one I/O transaction, a stream with a bit rate other than $W_{base}$ fetching or storing fewer or greater than $N_d'$ segments in each I/O cycle.

6. The method of claim 5 wherein for each I/O cycle, all of the I/O transactions scheduled within each such cycle from said plurality of streams are sorted separately according to locations of the segments on each storage unit.

7. The method of claim 5 wherein each of said storage units is a disk.

8. The method of claim 5 wherein said cycles are grouped into super-cycles comprised of $N_{super}$ cycles, and in cycle i of a super-cycle, stream j has $L_{i,j}$ I/O transactions where $L_{i,j}$ is an integer.

9. The method of claim 5 wherein the number $N_d'$ is different for different streams.

10. The method of claim 5 wherein each of said storage units is an array of disks.

11. The method of claim 10 wherein a server is associated with each array of disks.

12. The method of claim 5 wherein said segments from said files are allocated to said storage units in a regular cyclic pattern.

13. The method of claim 6 wherein $N_d$ consecutive segments from a file have the same physical address in said $N_d$ storage units.

14. The method of claim 5 wherein each of said cycles is divided in G subcycles.

15. The method of claim 14 wherein said plurality of streams is divided into G groups and in each subcycle $N_d'$ I/O transactions are scheduled for the streams in one group.

16. The method of claim 14 wherein said plurality of streams is divided into groups and in each subcycle one I/O transaction is performed for each stream in each of each of $N_d'$ groups.

17. A method for operating an array of $N_d$ storage units, wherein said storage traits are organized into $N_s$ s sub-arrays of $N_a$ storage units each, wherein data from one or more files are organized into substripes comprised of $N_a$ consecutive segments of S bits, wherein said substripes are allocated to said sub-arrays so that each substripe is allocated to one sub-array, said method comprising the steps of:

defining a sequence of I/O cycles having a duration determined according to the equation $N_aS/W_{base}$, wherein $W_{base}$ is a base rate of bits per second and scheduling I/O transactions by determining which segments are to be fetched or stored within said I/O cycles to maintain the continuity of a plurality of data streams, a stream with a bit rate of $W_{base}$ having $N_a$ I/O transactions in each I/O cycle such that one substripe of $N_a$ segments is fetched from or written into one sub-array.

18. The method of claim 17 wherein for each I/O cycle, the I/O transactions scheduled within each such cycle from said plurality of streams are sorted separately according to locations of said segments on each sub-array.

19. The method of claim 17 wherein each of said storage units comprises a disk.

20. The method of claim 17 wherein all of the substripes from at least one file are allocated to one sub-array.

21. The method of claim 17 wherein substripes from one or more files are randomly assigned to said sub-arrays.

22. The method of claim 17 wherein substripes from one or more of said files are cyclically allocated to said sub-arrays in a regular pattern.

23. The method of claim 17 wherein said I/O cycles are organized into super-cycles of $N_{super}$ cycles and in the $i^{th}$ cycle of a super-cycle a stream j has $L_{i,j}$ substripes written into or fetched from said sub-arrays, where $L_{i,j}$ is an integer.

24. The method of claim 17 wherein said streams are organized into groups which are desynchronized from one another.

25. The method of claim 17 wherein the number of sub-arrays and the number of storage units in a sub-array is different for different files.

26. The method of claim 17 wherein the division of said arrays into sub-arrays is different for different files.

27. The method of claim 17 wherein each of said storage units comprises an array of disks.

28. The method of claim 27 wherein a server is associated with each array of disks.

29. The method of claim 17 wherein said cycles are divided into G subcycles.

30. The method of claim 29 wherein in each sub-cycle, one substripe is fetched or written into a sub-array for each stream in one of G groups.

31. The method of claim 29 wherein in each sub-cycle, one substripe is fetched from or written into a sub-array for each stream in $N_a$ groups.

* * * * *